US010040725B2

(12) United States Patent
Perez-Pena

(10) Patent No.: US 10,040,725 B2
(45) Date of Patent: Aug. 7, 2018

(54) LIGHTWEIGHT FOAMED CEMENT, CEMENT BOARD, AND METHODS FOR MAKING SAME

(71) Applicant: United States Gypsum Company, Chicago, IL (US)

(72) Inventor: Marianela Perez-Pena, Grayslake, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 48 days.

(21) Appl. No.: 15/213,751

(22) Filed: Jul. 19, 2016

(65) Prior Publication Data

US 2018/0022653 A1  Jan. 25, 2018

(51) Int. Cl.
| | |
|---|---|
| *C04B 38/10* | (2006.01) |
| *C04B 24/16* | (2006.01) |
| *C04B 24/04* | (2006.01) |
| *C04B 24/26* | (2006.01) |
| *C04B 28/14* | (2006.01) |
| *C04B 40/00* | (2006.01) |
| C04B 103/20 | (2006.01) |
| C04B 103/32 | (2006.01) |
| C04B 103/48 | (2006.01) |
| C04B 111/10 | (2006.01) |

(52) U.S. Cl.
CPC ............ *C04B 38/10* (2013.01); *C04B 24/04* (2013.01); *C04B 24/16* (2013.01); *C04B 24/26* (2013.01); *C04B 24/2623* (2013.01); *C04B 28/141* (2013.01); *C04B 38/106* (2013.01); *C04B 40/0028* (2013.01); *C04B 2103/20* (2013.01); *C04B 2103/32* (2013.01); *C04B 2103/48* (2013.01); *C04B 2111/10* (2013.01)

(58) Field of Classification Search
CPC .................................................... C04B 38/10
See application file for complete search history.

(56) References Cited

U.S. PATENT DOCUMENTS

| | | | |
|---|---|---|---|
| 3,834,918 A | 9/1974 | Uogaeshi | |
| 4,057,608 A | 11/1977 | Hashimoto et al. | |
| 4,373,955 A | 2/1983 | Bouchard et al. | |
| 4,488,909 A | 12/1984 | Galer et al. | |
| 4,504,335 A | 3/1985 | Galer | |
| 4,518,652 A | 5/1985 | Willoughby | |
| 4,624,711 A | 11/1986 | Styron | |
| 4,657,594 A | 4/1987 | Struss | |
| 4,731,389 A | 3/1988 | Christopher et al. | |
| 4,916,004 A | 4/1990 | Ensminger et al. | |
| 5,250,578 A | 10/1993 | Cornwell | |
| 5,320,677 A | 6/1994 | Baig | |
| 5,536,310 A | 7/1996 | Brook et al. | |
| 5,536,458 A | 7/1996 | Kawakita et al. | |
| 5,643,510 A | 7/1997 | Sucech | |
| 5,696,174 A | 12/1997 | Chao et al. | |
| 5,900,191 A | 5/1999 | Gray et al. | |
| 6,046,255 A | 4/2000 | Gray et al. | |
| 6,613,424 B1 | 9/2003 | Putt et al. | |
| 6,869,474 B2 | 3/2005 | Perez-Pena et al. | |
| 6,929,875 B2 | 8/2005 | Savoly et al. | |
| 7,381,263 B2 | 6/2008 | Roddy et al. | |
| 7,435,768 B2 | 10/2008 | Lecolier et al. | |
| 7,670,427 B2 | 3/2010 | Perez-Pena et al. | |
| 7,767,019 B2 | 8/2010 | Liu et al. | |
| 8,277,556 B2 | 10/2012 | Berke et al. | |
| 8,519,016 B2 | 8/2013 | Perez-Pena | |
| 8,808,449 B2 | 8/2014 | Jezequel et al. | |
| 9,023,149 B1 | 5/2015 | Douglas et al. | |
| 2003/0159391 A1 | 8/2003 | Naji et al. | |
| 2003/0200714 A1 | 10/2003 | Minke et al. | |
| 2004/0026002 A1 | 2/2004 | Weldon et al. | |
| 2007/0079733 A1 | 4/2007 | Crocker | |
| 2007/0125273 A1* | 6/2007 | Pinto ...................... | C04B 28/04 106/638 |
| 2008/0176967 A1 | 7/2008 | Bui | |

(Continued)

FOREIGN PATENT DOCUMENTS

| | | |
|---|---|---|
| CA | 2418949 A1 | 2/2002 |
| CA | 2790286 A1 | 8/2011 |

(Continued)

OTHER PUBLICATIONS

Computer Translation of FR 3021652 (2015) (Year: 2015).*
LE Chatelier Flask, LE Chatelier Mould, URL: < http://www.shambhaviimpex.com/le-chatelier-flask.html>, retrieved from the Internet Jul. 14, 2016.
E. L. Gealy, Saturated Bulk Density, Grain Density and Porosity of Sediment Cores From the Western Equatorial Pacific: LEG 7, Glomar Challenger, pp. 1081-1104, retrieved from the Internet Jul. 7, 2016.
E.P. Kearsley et al., The effect of high fly ash content on the compressive strength of foamed concrete, Cement and Concrete Research 32, pp. 241-246, 2002.

(Continued)

*Primary Examiner* — Kara B Boyle
(74) *Attorney, Agent, or Firm* — Vorys, Sater, Seymour and Pease LLP; Pradip Sahu; Philip T. Petti

(57) ABSTRACT

Disclosed is a foamed cementitious composition which limits or eliminates aggregate, especially porous lightweight aggregate and uses a lower than usual water to cementitious composition weight ratio. The stable cementitious foam mixtures may be employed to make cement boards and other cement products. The foamed cementitious composition was made with additions of PVOH foaming stabilizer and surfactant foaming agents to make foam water or by entrain air into cementitious slurry mixtures. The cementitious mixtures have a limited amount or preferably no perlite and no lightweight aggregate. The resulting foamed mixture had foam bubbles with size in the range of 50 to 200 μm. After setting the foamed cementitious composition the resulting set board has air cells with size in the range of 50 to 200 μm.

20 Claims, 13 Drawing Sheets

(56) References Cited

U.S. PATENT DOCUMENTS

| | | | |
|---|---|---|---|
| 2009/0011207 A1 | 1/2009 | Dubey | |
| 2010/0071597 A1 | 3/2010 | Perez-Pena | |
| 2012/0148806 A1 | 6/2012 | Dubey et al. | |
| 2012/0167804 A1* | 7/2012 | Perez-Pena | C04B 18/027 106/677 |
| 2012/0172469 A1 | 7/2012 | Perez-Pena | |
| 2012/0312193 A1* | 12/2012 | Jezequel | C04B 28/04 106/678 |
| 2012/0315464 A1 | 12/2012 | Refouvelet et al. | |
| 2014/0138007 A1 | 5/2014 | Dubey et al. | |
| 2015/0033989 A1 | 2/2015 | Perez-Pena | |
| 2015/0083958 A1 | 3/2015 | Bernardi et al. | |
| 2015/0152011 A1* | 6/2015 | Wan | C04B 28/065 106/694 |

FOREIGN PATENT DOCUMENTS

| | | | | |
|---|---|---|---|---|
| FR | 3021652 | * | 4/2015 | B28C 5/381 |
| WO | 0142164 A1 | | 6/2001 | |
| WO | 2009035594 A2 | | 3/2009 | |
| WO | 2016010489 A1 | | 1/2016 | |

OTHER PUBLICATIONS

Oxirane, 2-methyl-, polymer with oxirane, mono(hydrogen sulfate), decyl ether, sodium salt, RN: 65423-85-0, URL: < http://chem.sis.nlm.nih.gov/chemidplus/rn/65423-85-0>, retrieved from the Internet Oct. 7, 2015.
STEOL® FS-406, Stepan Product Bulletin, Nov. 2010.
Sika ViscoCrete® G2 High-performance superplasticizer, Product Data Sheet, Innovation & Consistency, 2010.
Cement board systems, Durock® Brand Cement Board Systems, United States Gypsum Company SA932, 2012, URL: <usg.com/durockusgdesignstudio.com>, retrieved from the Internet Mar. 14, 2016.
E.P. Kearsley et al., Ash content for optimum strength of foamed concrete, Cement and Concrete Research 32, pp. 241-246, 2001.
Witconate™ AOS—AkzoNobel Personal Care, URL: < http://www.sc.akzonobel.com/en/personalcare/Pages/product-detail.aspx?prodID=6725 >, retrieved from the Internet Jun. 4, 2015.
Witcolate™ 1276, AkzoNobel Oilfiled, URL: < http://sc.akzonobel.com/en/oilfieldchemicals/Pages/product-detail.aspx?prodID=9163 >, retrieved from the Internet Oct. 7, 2015.
USG Tile & Flooring Solutions Portfolio Brochure, USG, 2015.
International Search Report dated Oct. 23, 2017 for PCT/US2017/042303 to United States Gypsum Company filed Jul. 17, 2017.

* cited by examiner

LIGHTWEIGHT FOAMED CEMENT, CEMENT BOARD, AND METHODS FOR MAKING SAME

FIELD OF THE INVENTION

This invention relates generally to stable cementitious foam mixtures with the potential use for cement board applications and other concrete products. In particular, the invention relates to additions of polyvinyl alcohol (PVOH) to cementitious mixtures to produce cementitious foamed binder compositions that can be used to make lightweight cementitious boards with excellent moisture durability for use in wet and dry locations in buildings. Precast concrete products such as cement boards are made under conditions which provide a rapid setting of the cementitious mixture so that the boards can be handled soon after the cementitious mixture is poured into a stationary or moving form or over a continuously moving belt. The invention is foamed cementitious composition which limits or eliminates aggregate, especially porous lightweight aggregate and uses a lower than usual water to cementitious composition weight ratio. This makes a foamed cement composition for a lightweight cement board.

BACKGROUND OF THE INVENTION

U.S. Pat. No. 6,869,474 to Perez-Pena et al, incorporated herein by reference, discusses extremely fast setting of cementitious compositions for producing cement-based products such as cement boards achieved by adding an alkanolamine to hydraulic cement such as Portland cement, and forming a slurry with water under conditions that provide an initial slurry temperature of at least 90° F. (32° C.). Additional reactive materials may be included such as high alumina cement, calcium sulfate and a pozzolanic material such as fly ash. The extremely rapid set permits rapid production of cementitious products. The use of expanded clay lightweight aggregates has been found to be a very useful in producing formulations with relatively low weight and high compressive strengths. However, the production of expanded clay aggregte is high energy intensive and depletes natural resources and their use limits the ability to design concrete mixtures at densities in the range of 40 to 50 pcf. Furthermore, the expanded clay aggregate are highly porous materials which tend to absorb the cement paste slurry, thus their relatively high in-situ density.

U.S. Pat. No. 7,670,427 of Perez-Pena et al, incorporated herein by reference, discusses extremely fast setting of cementitious compositions with early-age compressive strength for producing cement-based products such as cement boards achieved by adding an alkanolamine and a phosphate to a hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash. Again, all of the compositions contained a significant amount of hydraulic cement and gypsum.

Published US Patent Application No. US 2010-0071597 A1 of Perez-Pena discloses formulations using fly ash and alkali metal salts of citric acid such as sodium citrate to form concrete mixes with fast setting time and relatively high early age compressive strength. One of the challenges encountered with the activated fly ash binders described in this application, is an apparent interaction between these binders and the traditional foaming systems used to entrain air and thereby make lightweight boards. The fly ash based binders which have been made with traditional foams in accordance with this disclosed method have suffered foam collapsing and/or drastic strength reduction. In addition, fly ashes may increase the combustibility of building materials due to the increasingly organic carbon levels as a result of carbon injection during the power plant operations and as a result of recent EPA regulations to limit exhaust emissions into the environment.

U.S. Pat. No. 4,488,909 to Galer et al, incorporated herein by reference, discusses cementitious compositions capable of rapid setting. The compositions permit high speed production of carbon dioxide resistant products by forming essentially all of the potential ettringite within about 20 minutes after the composition is mixed with water. The essential components of the cementitious composition are portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement, which in combination with the other components makes possible the early formation of ettringite and other calcium aluminate hydrates responsible for early setting of the cementitious mixture. In their invention, Galer et al provided aluminates using high alumina cement (HAC) and sulfate ions using gypsum to form ettringite and achieve rapid setting of their cementitious mixture.

Ettringite is a calcium aluminum sulfate compound having the formula $Ca_6Al_2(SO_4)_3.32H_2O$ or alternatively $3CaO.Al_2O_3.3CaSO_4.32H_2O$. Ettringite forms as long needle-like crystals and provides rapid early strength to cement boards, so that they can be handled soon after being poured into a mold or over a continuous casting and forming belt.

U.S. Pat. No. 5,536,310 to Brook et al disclose a cementitious composition containing 10-30 parts by weight (pbw) of a hydraulic cement such as portland cement, 50-80 pbw fly ash, and 0.5-8.0 pbw expressed as a free acid of a carboxylic acid such as citric acid or alkali metal salts thereof, e.g., tripotassium citrate or trisodium citrate, with other conventional additives, including retarder additives such as boric acid or borax, which are used to accelerate the reaction and setting time of the composition to overcome the disclosed disadvantageous of using a high fly ash content in cement compositions.

U.S. Pat. No. 5,536,458 to Brook et al disclose a cementitious composition containing a hydraulic cement such as portland cement, 70-80 parts by weight fly ash, and 0.5-8.0 pbw of a free carboxylic acid such as citric acid or an alkali metal salts thereof e.g. potassium citrate or sodium citrate, additives like potassium hydroxide with other conventional additives including retarder additives such as boric acid or borax, which are used to accelerate the reaction and setting time of the composition to overcome the known disadvantageous of using a high fly ash content in cement compositions.

There is a need to find a method to reduce the weight of portland cements based binder mixes so these formulations can be used to manufacture lightweight cementitious concrete products for applications such as backer board and other wall or ceiling applications with improved strength without the use expanded clay aggregate. The present method has developed formulations with enhanced compressive strength at reduced weight and with reduced cost.

SUMMARY OF THE INVENTION

The present invention provides a method of providing a lightweight cementitious product comprising:

mixing a cementitious foamed mixture comprising
65-75 wt. % hydraulic cementitious reactive powder,
20-35 wt. % water
0.05-1 wt. %, preferably 0.1-0.7 wt. %, surfactant as a foaming agent;
0.1 to 1.0 wt. %, preferably 0.2 to 0.3 wt. %, polyvinyl alcohol as a foam stabilizing agent;
0-0.5 wt. % a retarder selected from the group consisting of citric acid, alkali metal salt of citric acid,
0.15-1.0 wt. %, preferably 0.2-0.5 wt. %, superplasticizer;
at least one member selected from the group consisting of aggregate and filler, wherein a weight ratio of total aggregate and filler to hydraulic cementitious reactive powder is 0 to 0.5:1, preferably 0 to 0.25:1, wherein all aggregate and filler of the cementitious foamed mixture is only lightweight non-porous aggregate and lightweight non-porous filler, preferably at least 80 wt. % of the aggregate and filler, if present, is coated perlite, wherein the lightweight non-porous aggregate and lightweight non-porous filler have a particle density of less than or equal to 40 lbs/cubic foot,
wherein the lightweight non-porous filler and the lightweight non-porous aggregate have an open porosity of at most 0.10;
water, wherein the foamed mixture weight ratio of water to hydraulic cementitious reactive powder is 0.3 to 0.5:1; and
air in the form of foam bubbles with diameter in the range of 50 to 200 μm, wherein the foamed mixture has air volume content of 20 to 55 volume %, preferably 30 to 50 volume %, more preferably 30 to 40 volume %;
wherein the hydraulic cementitious reactive powder comprises in % by weight relative to the weight of the hydraulic cementitious reactive powder:
75 to 95%, preferably 80-90%, Portland cement,
0 to 21%, preferably 5-10% high alumina cement, (also known as calcium aluminate cement),
0 to 10%, preferably 2 to 5%, calcium sulfate, and
0 to 25, preferably 5 to 20%, pozzolanic material, preferably at least 50 wt. %, more preferably at least 80 wt. % of the pozzolanic material is fly ash;
casting the cementitious foamed mixture and leaving the cast mixture to set to form the lightweight cementitious product,
wherein the set cementitious foamed mixture has, measured 14 days after casting, a nominal density of 45-60 pounds per cubic foot, preferably 45-60 pounds per cubic foot, and a nail pull value of greater than 90 pounds-force;
wherein the set cementitious foamed mixture has a compressive strength, measured 7 days after casting of 500 psi to about 5000 psi, preferably 500 to 3000 psi, more preferably 500 to 2000 psi.

Preferably the cementitious foamed mixture in the method has an absence of calcium chloride, calcium formate, and calcium nitrate.

The above listed set cementitious foamed mixture densities are dry densities, as opposed to densities after soaking a produced board in liquid.

The air content in volume percent in the cementitious foamed slurry and the set cementitious foamed mixture is estimated as the foam volume percent of the slurry. Thus, the foamed slurry has foam volume content of 20 to 55 volume %, preferably 30 to 50 volume %, more preferably 30 to 40 volume %. Also, the set cementitious foamed mixture has air volume content of 20 to 55 volume %, preferably 30 to 50 volume %, more preferably 30 to 40 volume %. The size of the air voids in the set cementitious foamed mixture is estimated as the size of the bubbles in the slurry. Preferably all the bubbles in the slurry come from the foam. Thus, the set cementitious foamed mixture has air voids with diameters in the range of 50 to 200 μm.

The air is preferably added as foam water, by entraining air into cementitious slurry, or by adding foam to cementitious slurry followed by entraining additional air into the mixture of foam water and cementitious slurry.

The invention also provides a foamed cement product comprising the set foamed mixture produced according to the above-described method.

The invention also provides a cement product comprising a set cementitious foamed mixture comprising:
65-75 wt. % hydraulic cementitious reactive powder,
0.05-1 wt. %, preferably 0.1-0.7 wt. %, surfactant as a foaming agent;
0.1 to 1.0 wt. %, preferably 0.2 to 0.3 wt. %, polyvinyl alcohol as a foam stabilizing agent;
0.1-0.5 wt. % a retarder selected from the group consisting of citric acid, alkali metal salt of citric acid;
0.15-1.0 wt. %, preferably 0.2-0.5 wt. %, superplasticizer;
at least one member selected from the group consisting of aggregate and filler, wherein a weight ratio of total aggregate and filler to hydraulic cementitious reactive powder is 0 to 0.5:1, preferably 0 to 0.25:1, wherein all aggregate and filler of the cementitious foamed mixture is only lightweight non-porous aggregate and lightweight non-porous filler, preferably at least 80 wt. % of the aggregate and filler is coated perlite, wherein the lightweight non-porous aggregate and lightweight non-porous filler have a particle density of less than or equal to 40 lbs/cubic foot, wherein the lightweight non-porous filler and the lightweight non-porous aggregate have an open porosity of at most 0.10;
wherein the product has air cells with diameter in the range of 50 to 200 μm, wherein the product has air cells volume content of 20 to 55 volume %, preferably 30 to 50 volume %, more preferably 30 to 40 volume %;
wherein the hydraulic cementitious reactive powder comprises in % by weight relative to the weight of the hydraulic cementitious reactive powder:
75 to 95%, preferably 80-90%, Portland cement,
0 to 21%, preferably 5-10% high alumina cement,
0 to 10%, preferably 2 to 5%, calcium sulfate, and
0 to 25, preferably 5 to 20%, pozzolanic material, preferably at least 50 wt. %, more preferably at least 80 wt. % of the pozzolanic material is fly ash;
wherein the product was made with a weight ratio of water to hydraulic cementitious reactive powder of 0.3 to 0.5:1;
wherein the product has a nominal density of 45-60 pounds per cubic foot, preferably 45-55 pounds per cubic foot, and a nail pull value of greater than 90 pounds-force; and
wherein the product has a compressive strength, measured after setting 7 days, of 500 psi to about 5000 psi, preferably 500 to 3000 psi, more preferably 500 to 2000 psi.

Preferably product has an absence of calcium chloride, calcium formate, and calcium nitrate.

The foamed mixture and the cement product have an absence of aggregate and filler particles having a particle density above 40 lbs/cubic foot. The foamed mixture and the cement product have an absence of aggregate and filler particles which absorb in pores a volume of water greater than 10% of the volume of aggregate and filler particles.

Preferably the filler or aggregate, if present, is coated perlite added at a perlite to hydraulic cementitious reactive powder weight ratio of 0 to 0.2:1. Most preferably the foamed mixture and the cement product have an absence of the perlite or any other filler or aggregate.

The lightweight cementitious compositions can be used in any concrete product application including cement boards, concrete panels, flooring, overlays, finishes, capping, as well as patching mixes for concrete roads.

All percentages, ratios and proportions herein are by weight, unless otherwise specified.

DETAILED DESCRIPTION OF THE INVENTION

Figure 1A:
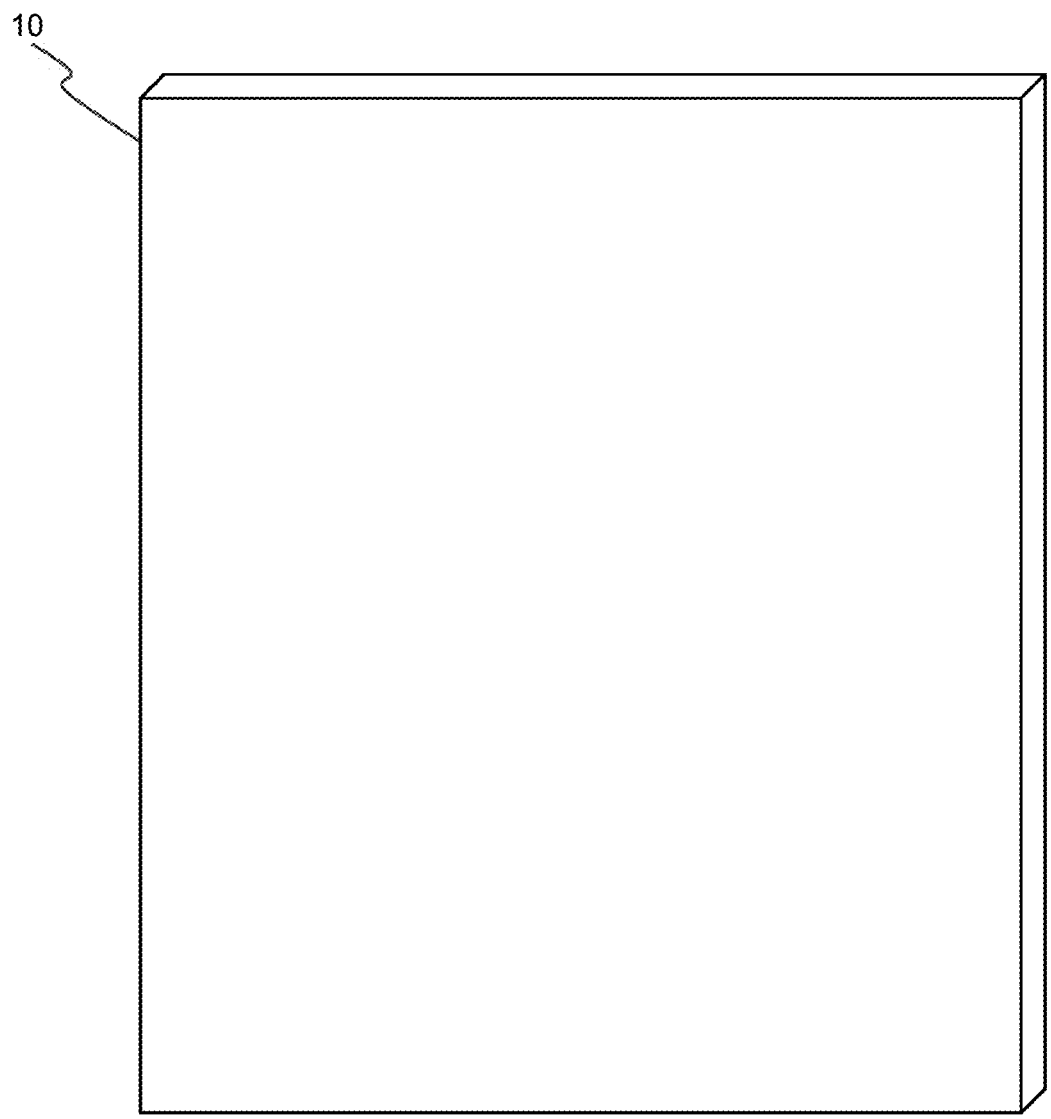
FIG. 1A shows a board made according to the present invention.

The present invention provides a method of providing a lightweight cementitious product comprising:
mixing a cementitious foamed mixture comprising
65-75 wt. % hydraulic cementitious reactive powder,
20-35 wt. % water
0.05-1 wt. %, preferably 0.1-0.7 wt. %, surfactant as a foaming agent;
0.1 to 1.0 wt. %, preferably 0.2 to 0.3 wt. %, polyvinyl alcohol as a foam stabilizing agent;
0-0.5 wt. % a retarder selected from the group consisting of citric acid, alkali metal salt of citric acid,
0.15-1.0 wt. %, preferably 0.2-0.5 wt. %, superplasticizer;
at least one member selected from the group consisting of aggregate and filler, wherein a weight ratio of total aggregate and filler to hydraulic cementitious reactive powder is 0 to 0.5:1, preferably 0 to 0.25:1, wherein all aggregate and filler of the cementitious foamed mixture is only lightweight non-porous aggregate and lightweight non-porous filler, preferably at least 80 wt. % of the aggregate and filler, if present, is coated perlite,
wherein the lightweight non-porous aggregate and lightweight non-porous filler have a particle density of less than or equal to 40 lbs/cubic foot,
wherein the lightweight non-porous filler and the lightweight non-porous aggregate have an open porosity of at most 0.10;
water, wherein the foamed mixture weight ratio of water to hydraulic cementitious reactive powder is 0.3 to 0.5:1; and
air in the form of foam bubbles with diameter in the range of 50 to 200 μm, wherein the foamed mixture has air volume content of 20 to 55 volume %, preferably 30 to 50 volume %, more preferably 30 to 40 volume %;
wherein the hydraulic cementitious reactive powder comprises in % by weight relative to the weight of the hydraulic cementitious reactive powder:
75 to 95%, preferably 80-90%, Portland cement,
0 to 21%, preferably 5-10% high alumina cement, (also known as calcium aluminate cement),
0 to 10%, preferably 2 to 5%, calcium sulfate, and
0 to 25, preferably 5 to 20%, pozzolanic material, preferably at least 50 wt. %, more preferably at least 80 wt. % of the pozzolanic material is fly ash;
casting the cementitious foamed mixture and leaving the cast mixture to set to form the lightweight cementitious product,
wherein the set cementitious foamed mixture has, measured 7 days after casting, a nominal density of 45-60 pounds per cubic foot, preferably 45-60 pounds per cubic foot, and a nail pull value of greater than 90 pounds-force;
wherein the set cementitious foamed mixture has a compressive strength, measured 14 days after casting of 500 psi to about 5000 psi, preferably 500 to 3000 psi, more preferably 500 to 2000 psi.

Preferably the cementitious foamed mixture has an absence of calcium chloride, calcium formate, and calcium nitrate.

The air is preferably added (a) by adding foam water to a slurry comprising the hydraulic cementitious composition, the surfactant, the polyvinyl alcohol, the retarder, the superplasticizer, and the water, (b) by entraining air into the slurry, or (c) by adding foam water to the slurry followed by entraining additional air into the mixture of foam water and slurry.

Adding the air as foam water comprises:
aerating a blend of a first portion of the water, the surfactant, and the polyvinyl alcohol with entrainment of air to form foam water, wherein the surfactant is 1 to 15% by weight, preferably 2 to 4% by weight, more preferably 2 to 3% by weight of the foam water; the polyvinyl alcohol is 0.5 to 10% by weight, preferably 1 to 4% by weight, more preferably 2 to 3% by weight of the foam water;
blending the foam water and a slurry comprising the hydraulic cementitious composition, a second portion of the water, an optional second portion of the polyvinyl alcohol, and an optional second portion of the surfactant, to produce the cementitious foamed mixture;
wherein the foamed mixture weight ratio of the foam water to the cementitious composition is 0.01 to 0.05:1.

Typically the polyvinyl alcohol is added to the foam water as an aqueous solution having a 0.25 wt. % to 3 wt. % concentration of polyvinyl alcohol.

Preferably the foamed mixture when blended with foam water has an initial temperature of about 68° F. to 115° F. (about 20° C. to 46° C.). However, it can be higher if faster reaction is desired.

Adding air by entraining comprises mixing the air into a slurry comprising the hydraulic cementitious composition, the surfactant, the polyvinyl alcohol, the retarder, the superplasticizer, and the water. Typically this mixing occurs in a static mixer.

Most preferably the method combines the above-mentioned two procedures. This adds the foam water to the slurry to form a foamed slurry comprising a first portion of the air, and then mixes the foamed slurry in the presence of air to entrain a second portion of the air into the foamed slurry.

Preferably in the method,
the cast mixture forms into a sheet,
the sheet sets to an initial set condition;
the initial set condition sheet is cut to form a pre-cured board; and
the pre-cured board is cured to a final set condition to form the board product;
wherein the board product has a density of 40-90 pcf, preferably 46-54 pcf,
and a nail pull value greater than or equal to 90 pounds-force, wherein the board has air cells with diameter in the range of 50 to 200 µm.

As explained in US 2015/0033989 to Perez-Pena et al, setting of the composition is characterized by initial and final set times, as measured using Gilmore needles specified in the ASTM C266 test procedure. The final set time also corresponds to the time when a cement-based product, e.g. a cement board, has sufficiently hardened so it can be handled. Those skilled in the art will understand curing reactions continue for extended periods after reaching the final setting time.

The invention also provides a foamed cement product comprising the set foamed mixture produced according to the above-described method.

The invention also provides a cement product comprising a set cementitious foamed mixture comprising:
65-75 wt. % hydraulic cementitious reactive powder,
0.05-1 wt. %, preferably 0.1-0.7 wt. %, surfactant as a foaming agent;
0.1 to 1.0 wt. %, preferably 0.2 to 0.3 wt. %, polyvinyl alcohol as a foam stabilizing agent;
0.1-0.5 wt. % a retarder selected from the group consisting of citric acid, alkali metal salt of citric acid;
0.15-1.0 wt. %, preferably 0.2-0.5 wt. %, superplasticizer;
at least one member selected from the group consisting of aggregate and filler, wherein a weight ratio of total aggregate and filler to hydraulic cementitious reactive powder is 0 to 0.5:1, preferably 0 to 0.25:1, wherein all aggregate and filler of the cementitious foamed mixture is only lightweight non-porous aggregate and lightweight non-porous filler, preferably at least 80 wt. % of the aggregate and filler is coated perlite, wherein the lightweight non-porous aggregate and lightweight non-porous filler have a particle density of less than or equal to 40 lbs/cubic foot, wherein the lightweight non-porous filler and the lightweight non-porous aggregate have an open porosity of at most 0.10;
wherein the product has air cells with diameter in the range of 50 to 200 µm, wherein the product has air cells volume content of 20 to 55 volume %, preferably 30 to 50 volume %, more preferably 30 to 40 volume %;
wherein the hydraulic cementitious reactive powder comprises in % by weight relative to the weight of the hydraulic cementitious reactive powder:
75 to 95%, preferably 80-90%, Portland cement,
0 to 21%, preferably 5-10% high alumina cement,
0 to 10%, preferably 2 to 5%, calcium sulfate, and
0 to 25, preferably 5 to 20%, pozzolanic material, preferably at least 50 wt. %, more preferably at least 80 wt. % of the pozzolanic material is fly ash;
wherein the product was made with a weight ratio of water to hydraulic cementitious reactive powder of 0.3 to 0.5:1;
wherein the product has a nominal density of 45-60 pounds per cubic foot, preferably 45-55 pounds per cubic foot, and a nail pull value of greater than 90 pounds-force; and
wherein the product has a compressive strength, measured after setting 7 days, of 500 psi to about 5000 psi, preferably 500 to 3000 psi, more preferably 500 to 2000 psi.

Preferably the product has an absence of calcium chloride, calcium formate, and calcium nitrate.

The foamed mixture and the cement product have an absence of aggregate and filler particles having a particle density above 40 lbs/cubic foot. Also, the foamed mixture and the cement product have an absence of aggregate and filler particles having an open porosity greater than 0.10. Thus, the foamed mixture and the cement product have an absence of aggregate and filler particles which in water or other aqueous medium absorb in pores a volume of water or aqueous medium greater than 10% of the volume of aggregate and filler particles.

Preferably the filler or aggregate, if present, is coated perlite added at a perlite to hydraulic cementitious reactive powder weight ratio of 0 to 0.2:1. Most preferably the foamed mixture and the cement product have an absence of the perlite or any other filler or aggregate.

The addition of retarder, for example, alkali salts of citric acid greatly facilitates the workability of the cementitious slurry. Employing alkali metal citrates and alkali metal silicates in methods and compositions of the invention improves mix fluidity contrary to other accelerators such as aluminum sulfate which may lead to premature stiffening of concrete mixtures.

The superplasticizer acts as a water reducing agent.
The surfactant acts as an air-entraining or foaming agent.
The polyvinyl alcohol acts as a foam stabilizer.

Other additives may also be present which are not considered cementitious reactive powder, but are part of the overall cementitious composition. Such other additives include one or more of, set accelerating agents, set retarding agents, shrinkage control agents, slurry viscosity modifying agents (thickeners), coloring agents and internal curing agents, may be included as desired depending upon the process ability and application of the cementitious composition of the invention.

The cementitious compositions of the invention have enhanced rapid final setting performance and enhanced early compressive strength.

Ingredients

The ingredients in the foamed slurry of the method and foamed cemetitious mixture of the present invention are listed in the following TABLE A.

TABLE A ingredients in the foamed slurry

| Ingredient | Weight % of the foamed slurry (unless otherwise specified) | | |
|---|---|---|---|
| | Useable | Preferred | More preferred |
| Hydraulic cementitious composition (reactive powder)* | 65-75% | | |
| Surfactant foaming agent | 0.05-1% | 0.1-0.7% | |
| Polyvinyl alcohol foam stabilizing agent | 0.1 to 1.0% | 0.2 to 0.3% | |
| Retarder | 0.1 to 0.5% | 0.2 to 0.3% | |
| Superplasticizer | 0.15-1.0% | 0.2-0.5 | |
| Alkali metal silicate | 0 to 1.5 | 0.5 to 1.5 | 0.5 to 1.0 |
| Weight ratio of total inert lightweight non-porous aggregate and non-porous filler (preferably coated perlite) to hydraulic cementitious reactive powder* | 0 to 0.5:1 | 0 to 0.25:1.0 | 0:1.0 |
| Weight ratio of water to hydraulic cementitious reactive powder | 0.15 to 0.3:1.0 | | |
| Volume % of air in foamed mixture or final product | 20 to 55% | 30 to 50% | 30 to 40% |

*Inert lightweight non-porous aggregate and lightweight non-porous filler are not part of the hydraulic cementitious composition (reactive powder).
The aggregate and filler, if any, of the cementitious foamed mixture is only lightweight non-porous aggregate and lightweight non-porous filler, wherein the lightweight non-porous aggregate and lightweight non-porous filler have a particle density of less than or equal to 40 lb/cubic foot and an open porosity of at most 0.10.

Foam Water

Preferably the air bubbles are added as foam water, most preferably the air bubbles are added only as foam water. Preferably the foamed slurry mixture has a weight ratio of foam water to cementitious composition of 0.01 to 0.05:1.0. TABLE B discloses ingredients in the foam water and parameters relating to the foam water.

TABLE B

Ingredients in the foam slurry mixture

| Ingredient | Weight % | | |
|---|---|---|---|
| | Broad | Preferred | More preferred |
| weight ratio of water to cementitious composition in the foamed mixture | 0.3 to 0.5:1.0 | | |
| Weight percent surfactant in the foam water | 1 to 15% | 2 to 4% | 2 to 3% |
| Weight percent polyvinyl alcohol in the foam water | 0.5 to 10% | 1 to 4% | 2 to 3% |

Setting and Compressive Strength

Setting of the composition is characterized by initial and final set times, as measured using Gilmore needles specified in the ASTM C266 test procedure. The final set time also corresponds to the time when a concrete product, e.g., a concrete panel, has sufficiently hardened so that it can be handled or trafficked, in the case of a concrete floor or road. Relatively higher early age (3 to 5 hours) compressive strength can be an advantage for concrete material because it can withstand higher stresses without deformation. It will be understood by those skilled in the art that curing reactions continue for extended periods after the final setting time has been reached.

Early age strength of the composition is characterized by measuring the compressive strength after 24 hours or after 7 days of curing as specified in the ASTM C109. Achieving high early strength allows for ease of handling the stacked panels.

The set cementitious foamed mixture has a compressive strength, measured 7 days after casting, of 500 psi to about 5000 psi, preferably 500 to 3000 psi, more preferably 500 to 2000 psi, most preferably 600 to 1000 psi.

Preferably the set cementitious foamed mixture has a compressive strength, measured 7 days after casting, in the range of 600 to 1000 psi and nail pull in the range of 90 to 115 lbf at density of 45 to 55 pcf. Most preferably the set cementitious foamed mixture has a compressive strength, measured 7 days after casting, in the range of 600 to 900 psi and nail pull in the range of 90 to 110 lbf at density of 48 to 53 pcf.

Hydraulic Cementitious Composition (Reactive Powder)

TABLE C lists the ingredients of the Hydraulic Cementitious Reactive Powder. In TABLE C any one or more preferred or more preferred features can be substituted for a broad feature in the methods and compositions of the present invention. However, preferably the preferred features are used together. Likewise, more preferably the more preferred features are used together.

TABLE C

| Hydraulic Cementitious Reactive Powder Ingredients (100 parts) | Weight % Hydraulic Cementitious Composition | | |
|---|---|---|---|
| | Useable | Preferred | More preferred |
| Portland Cement | 75% to 95% | 80-90% | |
| Calcium aluminate cement | 0% to 21% | 5-10% | |
| Calcium sulfate | 0 to 10% | 2% to 5% | 2 to 3.5% |
| pozzolanic material, preferably at least 50 wt % of the pozzolanic material is Fly Ash, more preferably at least 80% of the pozzolanic material is Fly Ash | 0 to 25% | 5 to 20% | 8 to 12% |
| added lime (hydrated)* | 0% to 0.7% | 0.4% to 0.7% | |

*Added lime not needed if reactive powder ingredients already contain sufficient lime. Lime is generally not added lime. Rather it is included as a chemical component of the fly ash.

The principal ingredient of the cementitious reactive powder of the cementitious composition of the invention is Portland cement. Calcium aluminate cement (CAC) is also known as high alumina cement or aluminous cement.

Pozzolans (Pozzolanic Material)

Pozzolans are a broad class of siliceous or siliceous and aluminous materials which, in themselves, possess little or no cementitious value but which will, in finely divided form and in the presence of water, react chemically with calcium hydroxide at ordinary temperature to form compounds possessing cementitious properties. The quantification of the capacity of a pozzolan to react with calcium hydroxide and water is given by measuring its pozzolanic activity. Pozzolana are naturally-occurring pozzolans of volcanic origin.

Preferably at least 50 wt % of the pozzolanic material is fly ash, more preferably at least 80% of the pozzolanic material is Fly Ash. Type C fly ash generally contains lime. Thus, when employing Type C fly ash, the hydraulic cementitious composition is typically free of externally added lime. Preferably at least half of the fly ash is Type C fly ash. The fly ash is most preferably at least 80% Class C fly ash.

Retarders

In the present invention, the retarder is at least one member of the group consisting of sodium citrate, potassium citrates, citric acid, gluconates, and mixtures thereof. Preferably, the retarder is selected from alkali metal salts of citric acid such as sodium or potassium citrate. The retarders make mixes with relatively good fluidity and which do not stiffen too quickly, i.e., do not stiffen faster than 5-10 minutes after mixing at temperatures above room temperature, while achieving good early age compressive strength.

The preferred alkali metal citrates are potassium citrates and sodium citrates and particularly tri-potassium citrate monohydrate and tri-sodium citrate monohydrate.

Set Retarders

Use of set retarders as a component in the compositions of the invention is optional. The primary function of a retarder is to keep the slurry mixture from stiffening too rapidly thereby promoting synergistic physical interaction and chemical reaction between the different reactive components.

Conventional retarders such as citric acid, tartaric acid, malic acid, acetic acid, boric acid, etc. can be avoided with the use of the alkali metal salts of citric acid, e.g., sodium or potassium citrate, in the absence of these conventional set retarders. This provides for good fluidity and good setting characteristics which prevents the concrete slurry from stiffening too quickly.

Set Accelerators

Optionally inorganic set accelerators may be added. Examples of such inorganic set accelerators include a sodium carbonate, potassium carbonate, calcium nitrate, calcium nitrite, calcium formate, calcium acetate, calcium chloride, lithium carbonate, lithium nitrate, lithium nitrite, aluminum sulfate, alkanolamines, polyphosphates and the like. A preferred accelerator comprises an alkanolamine selected from the group consisting of triethanolamine, diethanolamine, monoethanolamine and mixtures thereof. Triethanolamine is most preferred.

The use of potassium hydroxide, sodium hydroxide and calcium chloride should be avoided when corrosion of cement board fasteners is of concern. The weight ratio of the inorganic set accelerator to 100 parts by weight of the cementitious reactive powder blend typically will be less than about 1.0 wt. %, preferably less than about 0.25 wt. %. These secondary inorganic set accelerators can be used alone or in combination.

Preferably the compositions and methods of the invention have an absence of water soluble calcium salts which are accelerators, particularly an absence of calcium chloride, calcium formate, and calcium nitrate. The term "water-soluble calcium salt" is to be understood as a salt having a solubility in water at 20° C. greater than 2 g/100 ml. Calcium sulfates are not "water-soluble calcium salts".

Superplasticizers

Water reducing agents (superplasticizers) are employed in the compositions and methods of the present invention.

Superplasticizers, also known as high range water reducers, are chemical admixtures used where well-dispersed particle suspension is required. These polymers are used as dispersants to avoid particle segregation (gravel, coarse and fine sands), and to improve the flow characteristics (rheology) of slurries of the present invention. Their addition to the slurries of the invention allows the reduction of the water to cement ratio, not affecting the workability of the mixture.

Superplasticizers are a class of water reducers capable of reducing water contents by about 30%. The superplasticizers have been broadly classified into four groups: sulphonated naphthalene formaldehyde condensate (SNF) (generally a sodium salt); or sulphonated melamine formaldehyde condensate (SMF); modified lignosulfonates (MLS); and others. More recent superplasticizers include polycarboxylic compounds such as polyacrylates polymers. The superplasticizer is preferably a copolymer containing polyethylene glycol as graft chain and carboxylic functions in the main chain such as a polycarboxylic ether. Sodium polycarboxylate-polysulphonates and sodium polyacrylates may also be used.

Preferably, the foamed concrete according to the present invention comprises a PCE superplasticizer. The term "PCE" is to be understood according to the present invention as polycarboxylate ether-based superplasticizers. Such chemicals allow for significant water reduction in the cement paste because they provide negative charges which complexes the positive ionic species of the cement particles and enables dispersion due to electrostatic repulsion forces. These may include polycarboxylate dispersant polymers as disclosed in U.S. Pat. No. 7,767,019 to Liu et al incorporated by reference.

The foamed concrete of the invention preferably does not comprise an antifoaming agent. Some commercial superplasticizers may contain antifoaming agents and may be unsuitable for use in the invention.

Air-Entraining Agents

One or more air entraining agents (also known as liquid foaming agents) are added to the cementitious slurry of the invention to form air bubbles (foam) in situ. Air entraining agents are typically surfactants used to purposely trap microscopic air bubbles in the concrete. Alternatively, air entraining agents are employed to externally produce foam (foam water) which is introduced into the mixtures of the compositions of the invention during the mixing operation to reduce the density of the product. Typically to externally produce foam the air entraining agent, air and water are mixed to form foam in a suitable foam generating apparatus.

Polyvinyl alcohol (PVOH) can be added to the foam as a foam stabilizing agent before the foam is added to the cementitious slurry. Preferably, PVOH is added.

The air entraining agents are surfactants, generally also known as soaps. A preferred air-entraining agent is alpha-olefin sulfonate (AOS) which is a type of anionic surfactant processed by alpha-olefin gas-phase sulfonation and continuous neutralization. Other examples of suitable air entraining/foaming agents include alkyl sulfonates, alkyl-benzolfulfonates and alkyl ether sulfate oligomers among others. Details of the general formula for these foaming agents can be found in U.S. Pat. No. 5,643,510 incorporated herein by reference.

An air entraining agent (foaming agent) such as that conforming to standards as set forth in ASTM C 260 "Standard Specification for Air-Entraining Admixtures for Concrete" (Aug. 1, 2006) may be employed. Such air entraining agents are well known to those skilled in the art and are described in the Kosmatka et al "Design and Control of Concrete Mixtures," Fourteenth Edition, Portland Cement Association, specifically Chapter 8 entitled, "Air Entrained Concrete," (cited in US Patent Application Publication No. 2007/0079733 A1). Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl) ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof. Preferred foaming agents are alpha olefin sulfonates and sodium lauryl ethoxy sulfate, namely sodium polypropoxy-polyethoxy-decyl sulfate (molecular formula $C_{10}H_{22}$—$O(C_3H_6$—$OC_2H_4$—$O)_x$—$H_2SO_4$—Na).

Other Chemical Additives

Other chemical admixtures such as shrinkage control agents, coloring agents, viscosity modifying agents (thickeners) and internal curing agents may also be added in the compositions of the invention if desired.

Aggregates and Fillers

Optionally compositions of the present invention also comprise lightweight non-porous aggregate or filler.

The foamed mixture and the cement product of the present invention have a weight ratio of total inert lightweight non-porous aggregate and non-porous filler (preferably coated perlite) to hydraulic cementitious reactive powder of 0 to 0.5:1, preferably 0 to 0.25:1, more preferably 0:1. However, a desirable composition of the present invention also has a 0.05 to 0.25:1.0 weight ratio of total inert lightweight non-porous aggregate and non-porous filler (preferably coated perlite) to hydraulic cementitious reactive powder.

The aggregate and filler is lightweight aggregate and filler having a particle density of at most 40 pounds per cubic foot, preferably at most 30 pounds per cubic foot. Particle density of the aggregate and filler is suitably measured using the Le Chatlier Flask method for finding specific gravity of hydraulic cement. In contrast, in-situ density of the filler and aggregate, as discussed below, is measured by mixing the various cementitious powder binder and all the liquids without using foam. The wet density of the mix and the already known density of its other ingredients such as the Portland cement, water, etc. are used to determine the in-situ density of the filler and aggregate by performing a mass balance using a spread sheet containing the information for all ingredients.

However, the in-situ density of some porous lightweight aggregate and filler when placed in a concrete mixture can be as much as 3 times its initial bulk density. Such porous lightweight aggregate and filler is not suitable in the present invention. The ability to reduce weight with these lightweight aggregates and fillers is limited because of the high open porosity of the aggregate. Furthermore, the cement mix and water absorbed by the aggregate and filler can migrate out into the surface of the concrete and may lead to slower rate of curing, and concrete discoloration. Furthermore, the mix components as well as the workability of the mix are important parameters to maintain a consistent shape of the cementitious units. The highly porous aggregate and filler limits the ability to maintain a good workability at the reduced water to cement ratios, which in turn limits the ability to develop mixtures with high compressive strengths.

Thus, the aggregate or filler employed in the present invention also has a closed porosity, which means an open porosity less than 0.10, preferably an open porosity less than 0.05, more preferably an open porosity less than 0.02, most preferably an open porosity about zero. A desired open porosity range is 0.05 to 0.02. Open porosity means the "accessible void," the total amount of void space accessible from the particle surface. The term open porosity is explained in more detail below.

For purposes of this specification fillers are the fine granular materials (size<5 mm in diameter particles) such as perlite, which is lightweight filler. The term aggregate means fillers with relatively larger particles (size>5 mm and up to few inches in diameter particles). Preferably at least 80 wt. % of the aggregate and filler, if present, is coated perlite. Filler and aggregate are both inert.

The present invention uses lightweight aggregate produced from materials such as expanded forms of clay, shale, or slate and produced by special processes that seal the outer surface of the particles yielding particles with closed porosity which prevents the cementitious slurry from penetrating into the aggregate particle. However, vermiculite, and coated perlite can be used as substitutes if they are produced with closed porosity. Other examples of useable lightweight aggregates and fillers include hollow ceramic spheres, hollow plastic spheres, expanded plastic beads, and the like. For producing cement boards, expanded clay and shale aggregates are particularly useable. Expanded plastic beads and hollow plastic spheres when used in the composition are required in very small quantity on weight basis owing to their extremely low bulk density.

Mineral additives such as calcium carbonate, vermiculite, and crushed mica may also be included as optional mineral fillers.

Preferably the filler or aggregate, if present, is coated perlite added at a perlite to hydraulic cementitious reactive powder weight ratio of 0 to 0.2:1. Most preferably the foamed mixture and the cement product of the present invention have an absence of the perlite or any other filler or aggregate. However, desirable foamed mixtures and cement products of the present invention have a 0.05 to 0.2:1.0 weight ratio of coated perlite to hydraulic cementitious reactive powder. The perlite is preferably composed of particles having a median particle size of 20-60 microns in diameter. Preferably it has a particle density of less than 0.30 g/cc. Coated perlite has a coating, such as a coating of silane, siloxane, silicone or a mixture thereof, to prevent water absorption into interior pores of particles of the perlite. Thus, it achieves open porosity of less than 0.10, preferably an open porosity less than 0.05, more preferably an open porosity less than 0.02, most preferably zero. A desirable porosity is 0.05 to 0.02. U.S. Pat. No. 4,657,594 to Struss, incorporated by reference, describes examples of perlite coated with an amino-functional siloxane and a silicone wetting agent.

Thus, the foamed mixture and the cement product have an absence of aggregate and filler particles having particle density above 40 lbs/cubic foot. Also, the foamed mixture and the cement product have an absence of aggregate and filler particles having particle (open) porosity above 0.10. Thus, if tested in aqueous medium, for example water or aqueous slurry, the foamed mixture and the cement product have an absence of aggregate and filler particles which absorb in pores a volume of the aqueous medium greater than 10% of the volume of particles. Preferably the foamed mixture and the cement product have an absence of aggregate and filler particles having particle density above 30 lbs/cubic foot and particle (open) porosity above 0.05.

Open Porosity

The filler or aggregate employed in the present invention has an open For purposes of the present specification open porosity of a material (such as filler or aggregate) describes the fraction of void space in the material open to the surface, where the void may contain, for example, air or water. Open porosity is defined by the ratio: $\phi=[(\rho_{in-situ}-\rho_{bulk})/(\rho_{in-situ}-\rho_{slurry})]$ $\phi$=Open Porosity of the aggregate
$\rho_{bulk}$=Bulk density of the aggregate
$\rho_{in-situ}$=In-situ density of the aggregate
$\rho_{slurry}$=Density of surrounding slurry of cement and liquids Open porosity represents the pores open to the surface which are available for receiving surrounding slurry or any portion of the slurry.

In-situ density of a particle of the aggregate in a slurry of the present invention is the density of an aggregate particle within the surrounding slurry. The in-situ density of an aggregate particle is measured by mixing the cementitious powder binder ingredients and all the liquids without using foam to form a Final Mixture. The wet (water included) density of the mix (also known as Final Mixture Density) is known. Also, except for the aggregate, the densities of all the other ingredients, such as the Portland cement, water, etc. are known. These known densities are used to determine the in-situ density of the aggregate by performing a mass balance using a spread sheet containing the information for all ingredients used.

Final mix density is measured using a known quantity of cements, liquids, and aggregate to fill up a known volume. The density of all ingredients except that of the aggregate is known. Thus, for example, the in situ density ($D_a$) of the aggregate is estimated from this measurement using Equation IV derived as follows.

$$W_t=W_c+W_a+W_l \qquad \text{Equation I}$$

$$D_t \times V_t = D_c \times V_c + D_a \times V_a + D_l \times V_l \qquad \text{Equation II}$$

$$D_a \times V_a = (D_t \times V_t)-[(D_c \times V_c)+(D_l \times V_l)] \qquad \text{Equation III}$$

$$D_a = \{(D_t \times V_t)-[(D_c \times V_c)+(D_l \times V_l)]\}/V_a \qquad \text{Equation IV}$$

The following is an example for calculating $D_a$=Aggregate In-situ density using the following known values:

$W_t$=Total mix weight=4245 g
$W_c$=Cement weight=2091 g
$W_a$=Aggregate weight=941 g
$W_l$=Liquids weight=1213 g
$D_t$=Total mix density=105 pounds per cubic foot (pcf) (1.68 gm/cm$^3$)
$V_t$=Total mix volume=4245 lb/105 pounds per cubic foot=40.42 cubic feet=100%
$D_c$=Cement particle density=196.6 pcf (3.15 gm/cm$^3$) measured using the Le Chatlier Flask method for finding specific gravity of hydraulic cement
$V_c$=Cement particle volume=26.3%
$V_a$=Aggregate particle volume=25.8%
$D_l$=Liquid density=62.4 pcf (1 gm/cm$^3$)
$V_l$=Liquid volume=47.9%
$D_a$=Aggregate In-situ density (unknown)

$$D_a=\{D_t \times V_t-[(D_c \times V_c)+(D_l \times V_l)]\}/V_a$$

This simplifies to the following equation VI:

$$D_a=W_a/[(W_t \times 62.4/D_t)-(V_c+V_l)] \qquad \text{Equation (VI)}$$

$$D_a=941/[(264888/105)-1877]=1.5 \text{ g/cc}$$

This aggregate having Da of 1.5 g/cc is too heavy for use in the present invention. The following TABLE D shows the values of parameters of a slurry mixture of the present invention with coated perlite for a test to calculate the in situ density of the coated perlite.

TABLE D

Perlite In-situ density test parameters

| Raw Materials | Wt, grams | Density, g/cc | Density, pcf |
|---|---|---|---|
| Portland cement | 833 | 3.15 | 196.6 |
| Perlite | 100 | Unknown | Unknown |
| Water | 500 | 1.0 | 62.4 |
| Mix Density | | 1.23 | 76.8 |

Steps to measure parameters for in situ density calculation:

1—Batch the Portland cement and perlite and carefully place in a plastic bag and shake until powders are homogeneous 2—Add solids to the mixing bow 3—Weigh the water.

4—Add liquids to the solids while mixing with the Hobart mixer at low speed (#1) (about 20 seconds)

5—Stop mixer and increase speed to medium (#2) and mix for about 40 seconds (for a total mixing time of 1 minute from the time the liquids are added).

6—Pour mix in cups similar to those used to measure slurry density.

7—Determine perlite in-situ density ($D_a$) using slurry density according to Equation VII.

$$D_a=100/[(89419/\text{Slurry density})-764]=0.25 \text{ g/cc}=15.6 \text{ pcf} \qquad \text{Eq. VII}$$

A second example for aggregate for which the density is within the desired range is as follows. The amount of aggregate used was 315 grams and the measured mix slurry density was 95.0 pcf. Therefore, the in-situ aggregate density ($D_a$) would be as follows according to Equation VIII.

$$D_a=315/[(225,825/\text{Slurry density})-1877]=0.62 \text{ g/cc}=39 \text{ pcf} \qquad \text{Eq. VIII}$$

Initial Slurry Temperature

For purposes of this disclosure initially high slurry temperature is the temperature in the first minute after mixing water and cementitious reactive powder. The initial slurry temperature should be about 68° F. (20° C.) to 115° F. (41.1° C.). Slurry temperatures in the range of 38° C. to 41° C. produce short setting times, and are therefore preferred. In general, within this range increasing the initial temperature of the slurry increases the rate of temperature rise as the reactions proceed and reduces the setting time.

As will be understood by those skilled in the art, achieving an initial slurry temperature may be accomplished by more than one method. Perhaps the most convenient method is to heat one or more of the components of the slurry. In the examples, the present inventors supplied water heated to a temperature such that, when added to the dry reactive powders and unreactive solids, the resulting slurry is at the desired temperature. Alternatively, if desired the solids could be provided at above ambient temperatures. Using steam to provide heat to the slurry is another possible method that could be adopted.

Although potentially slower, a slurry could be prepared at 68° F. (20° C.) to 78° F. (25.6° C.), and promptly (e.g., within about 10, 5, 2 or 1 minutes) heated to raise the temperature to about 90° F. (32.2° C.) or higher (or any of the other above-listed ranges), and still achieve benefits of the present invention.

Method for Introducing Air into Cementitious Slurry

The preferred methods for entraining air in the cementitious slurries of the invention is a follows.

The foam was prepared ex-situ as foam water and the foam water was blended with the portland cement binders. To prevent the foam bubbles to collapse while blending into the portland cement slurries it was beneficial to use a blend of as foaming agent and polyvinyl alcohol (PVOH) as foam stabilizer. The preferred foaming agent is stable soap made of long carbon chain ($C_{12}$-$C_{16}$), most preferably alpha olefin sulfonate (AOS) soap, and contains no ammonia to prevent unwanted ammonia smell as the reaction is taking place during mixing. The addition of the PVOH acted as a stabilizer and it appears to be crucial to the foam stability and cellular integritity of the foamed fly ash binders.

The present invention has no need to create the foam in the slurry mixture or previously called in-situ foaming in the cementitious slurry mix. Instead it is fed to the slurry mixer. Preferably al the foam is made ex-situ as foam water and added to the slurry.

Manufacturing of Precast Concrete Products Such as Cement Boards

Precast concrete products such as cement boards are manufactured most efficiently in a continuous process in which the reactive powder is blended with aggregates, fillers and other necessary ingredients, followed by addition of water and other chemical additives just prior to placing the mixture in a mold or over a continuous casting and forming belt.

Due to the rapid setting characteristics of the cementitious mixture it should be appreciated that the mixing of dry components of the cementitious blend with water and air usually will be done just prior to the casting operation. As a consequence of the formation of the alkali alumino silicate hydrates and/or other hydrates of alumino silicates and/or calcium alumino silicate compounds, the concrete product becomes rigid, ready to be cut, handled and stacked for further curing.

Figure 1B:
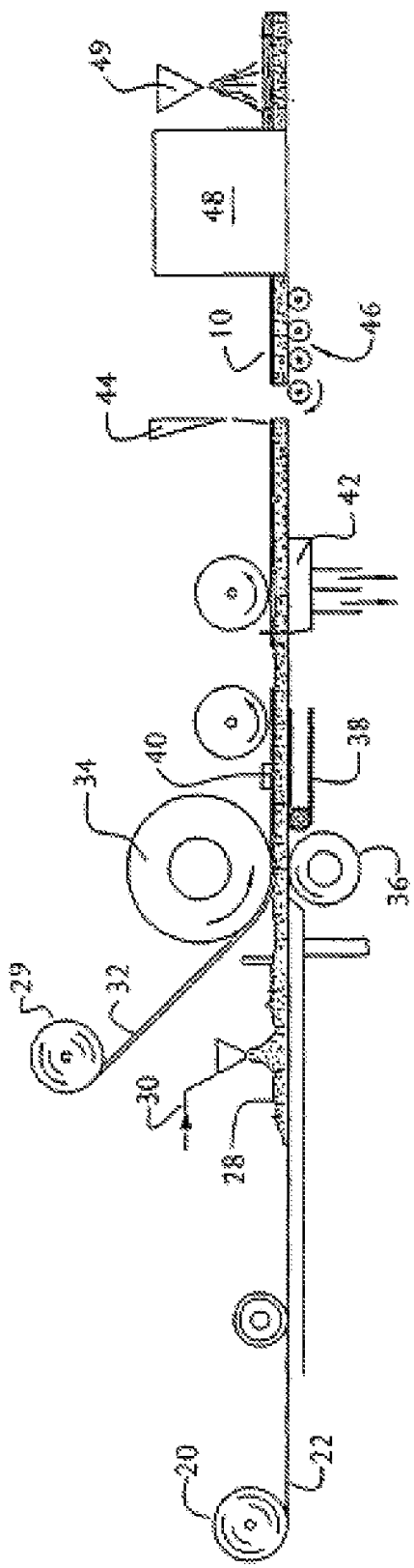
FIG. 1B shows an apparatus for making a board of the present invention.

An attractive feature of the present invention is the cementitious board 10 of FIG. 1A can be made utilizing the foamed cementitious mixture of the present invention in existing cement board manufacturing lines, for example, as shown diagrammatically in FIG. 1B.

The dry ingredients (not shown) from which the cementitious core 12 is formed are pre-mixed and then fed to a mixer of the type commonly referred to as a mixer 30. Water and other liquid constituents (not shown) used in making the core are metered into the mixer 30 where they are combined with the dry ingredients to form an aqueous cementitious slurry 28. Foam is generally added to the slurry in the mixer 30 to control the density of the resulting cementitious core 12.

A sheet of top coated fiberglass fabric 32 is fed from the top glass fabric roll 29 onto the top of the cementitious slurry 28, thereby sandwiching the slurry between the two moving fabrics which form the facings of the cementitious core 12 which is formed from the cementitious slurry 28. The bottom and top glass fabrics 22 and 32, with the cementitious slurry 28 sandwiched there between enter the nip between the upper and lower forming or shaping rolls 34 and 36 and are thereafter received on a conveyer belt 38. Conventional wallboard edge guiding devices 40 shape and maintain the edges of the composite until the slurry has set sufficiently to retain its shape. Sequential lengths of the board are cut by a water knife 44. The cementitious board 10 is next moved along feeder rolls 46 to permit it to set. An additional sprayer 49 can be provided to add further treatments, such as silicone oil, additional coating, or fire retardants, to the exterior of the board.

EXAMPLES

The following examples employ Portland cement, class C fly ash, and calcium sulfate dihydrate (landplaster) as the components of the hydraulic cementitious reactive powder.

The effects of using a foam stabilizer such as polyvinyl alcohol (PVOH) in combination with various foaming agents (surfactants) were investigated. Additions of PVOH solutions (conc. 0.25% and up to 3%) and surfactants additions of 1 to up to 10% (by weight of foam water) were used to make a pre-formed foam which was added to the cementitious mixtures. Cementitious foams can be made without the use of lightweight aggregate. Data shows reduced amounts of lightweight fillers such as perlite could be used by lowering the water to cement ratios which were found to have similar compressive strength compared to mixtures with increased perlite that required a higher water to cement ratio. This indicated the use of perlite was not required to achieve the desired compressive strength.

The present work unexpectedly achieved desired compressive strength and nail pull performance by eliminating the lightweight aggregate, reducing water to cement ratios, and using aqueous stable foam systems. The foam stability was initially assessed by the relative size of foam bubbles by examining with the naked eye the casts.

The raw materials and ingredients used in these examples were as follows:

Land Plaster as the source of calcium sulfate dihydrate.
Type III Portland cement
Class C fly ash
Expanded clay aggregate in Example 1 and other examples if indicated
Coated perlite having a porosity less than 0.05
Sodium Citrate (Tri-sodium citrate monohydrate)
Sodium trimetaphosphate (STMP)
Superplasticizer polycarboxylate (40% solution)
Alpha olefin sulfonate (AOS) soap in Example 1 or other surfactants as indicated in the respective examples, such as sodium lauryl ethoxy sulfate (SLS) surfactant. The examples used three different AOS soaps. These are surfactants and were designated AOS1 (20 to 25% Butyl Diglycol, 7 to 15% Sodium Lauryl Ether Sulfate, 3 to 5% alcohols C10-C16), AOS2 soap which is Ammonium C10-C12 alcohol ether sulfate, and AOS3 which is Sodium C14-16 Olefin Sulfonate. Some Examples use as a foaming agent sodium lauryl ethoxy sulfate, namely sodium polypropoxy-polyethoxy-decyl sulfate (molecular formula $C_{10}H_{22}$—O$(C_3H_6$—$OC_2H_4$—O$)_x$—$H_2SO_4$—Na).

PVOH solution (concentration 2 to 5%) was first prepared using warm water (50 to 80° C.) until PVOH completely dissolved. The PVOH solution was allowed to reach to room temperature and then the surfactant soap (8% soap solution) was added and foamed prior to blending with Portland cement/sodium citrate/water slurry using standard mixing procedures. The surfactant used in Example 1 was AOS3 soap.

Foam was produced by aerating the foam solutions to produce to desired foam volume of foam water and added to the cementitious mixtures using a HOBART mixer. Mixtures were made in the laboratory with controlled temperature of 75° F. and 50% relative humidity. Cube specimens and lab panels were placed in a room with controlled temperature of 90° F. and 90% relative humidity until the time of test.

The foam water and the liquids in the admixtures were used to calculate the water to cement ratio. The cementitious binder consisted of a blend of Portland cement type III, fly ash and gypsum and their ratios were kept constant as the density of the mixtures was varied. Similarly, other admixtures currently added to cement board process such as triethanolamine; sodium citrate ($K_3C_3H_5O(CO_2)_3$) and sodium trimetaphosphate ($NaPO_3)_3$, were kept constant as the density was varied. In addition, mixtures contained a polycaboxylate ether (PCE) based superplasticizer. The effect of various amounts of expanded clay aggregate, perlite, and water was evaluated. Detailed formulations are included in the following sections for each set of experiments. TABLE 1 includes the chemical analysis of the cement used during the study. TABLE 2 provides abbreviations.

TABLE 1

Chemical oxide analysis and chemical compounds for the Type III cement used

| Wt % | Type III Portland Cement |
| --- | --- |
| CaO | 61.62 |
| SiO$_2$ | 19.68 |
| Al2O3 | 4.97 |
| Fe$_2$O$_3$ | 2.50 |
| SO$_3$ | 3.95 |
| MgO | 2.51 |
| Na$_2$O | 0.32 |
| K$_2$O | 1.13 |
| TiO$_2$ | 0.26 |
| MnO | 0.07 |
| Cr$_2$O$_3$ | 0.10 |
| P$_2$O$_5$ | 0.24 |
| SrO | 0.09 |
| Loss On Ignition (1000° C.) | 1.54 |
| Total | 98.89 |
| C$_3$S | 53.1 |
| C$_2$S | 16.4 |
| C$_3$A | 8.9 |
| C$_4$AF | 7.6 |
| Alkali | 1.1 |
| Blaine fineness (total surface area in square centimeters per gram of cement according to ASTM C204) | 5930 |

TABLE 2

Definition of major of major chemical compounds found in Portland cements

| Shorthand Notation* | Name | Chemical Formula |
| --- | --- | --- |
| C$_3$S | Tricalcium Silicate | 3CaO•SiO$_2$ |
| C$_2$S | Dicalcium Silicate | 2CaO•SiO$_2$ |
| C$_3$A | Tricalcium Aluminate | 3CaO•Al$_2$O$_3$ |
| C$_4$AF | Tetracalcium Alumino-ferrite | 4CaO•Al$_2$O$_3$•Fe$_2$O$_3$ |

*The shorthand notation used by cement chemists using abbreviations for the oxides: CaO = C; SiO$_2$ = S; Al$_2$O$_3$ = A; Fe$_2$O$_3$ = F; also SO$_3$ = S and H$_2$O = H The following parameters were measured:
1. Cube compressive strength after 7 days as a function of slurry density. Specimen size was 2"×2"×2".
2. Nail pull of panels after 14 days curing.

Cube Compressive Strength Procedure

A HOBART N50 5 Qt. mixer was used to prepare mixtures and cast cube specimens in a room with controlled temperature of 73° F. (23° C.) and 50% relatively humidity. The foam for each mixture was formed by aerating the required amount of foam water and surfactants (foaming agents) using a HAMILTON BEACH mixer prior to adding the pre-formed foam to the cement plus admixtures. The cements and the liquids with the admixtures were being mixed simultaneously while the foam was being prepared after which both are further homogenized with the whip in the HOBART mixer. After this mixing process the mixtures are poured in the cube molds were placed inside sealed plastic bag containing a moist towel and transferred to a room with controlled temperature of 90° F. (32° C.) and 90% relative humidity for 7 days until the time of test. The maximum load required to crush the cubes was measured using a SATEC UTC 120HVL compression machine, which was programmed to meet the rate of loading specified by procedure ASTM C109. The reported compressive strength for each mixture reported was the result of the average of six cubes. Tests studies for each formulation a series of mixtures with various densities to be able to characterize the compressive strength behavior within a specific density range. For this reason a line fit using a graphics program was used to determine the line fit and equation for the compressive strength as a function of mix density. This way the compressive strength of a mixture with a specific density can be estimated.

Panel Nail Pull Test Procedure

A top HOBART LEGACY HL120 12 Quart Mixer was used to prepare the laboratory panels. The wet slurry density was measured in a plastic cup of determined size (~556 cc). The lab panel made in a mold of 3 ft×1 ft and target thickness of ½". Panels were wrapped and cured for 14 days in a room with controlled temperature 90° F. (32° C.) and 90% relatively humidity. After curing panel samples were cut to a 4"×4". The cured density of each individual panel sample was measured by measuring each specimen thickness, width, length and dry/wet weight. Each dimensional parameter, together with the measured nail pull value was reported for each specimen.

The nail pull test procedure followed ASTM D1037. The target was to have a formulation which would produce panels with at least 90 lbf nail pull and can be used in wall assemblies or as tile substrates that can perform under high moisture conditions.

Example 1

Figure 1C:
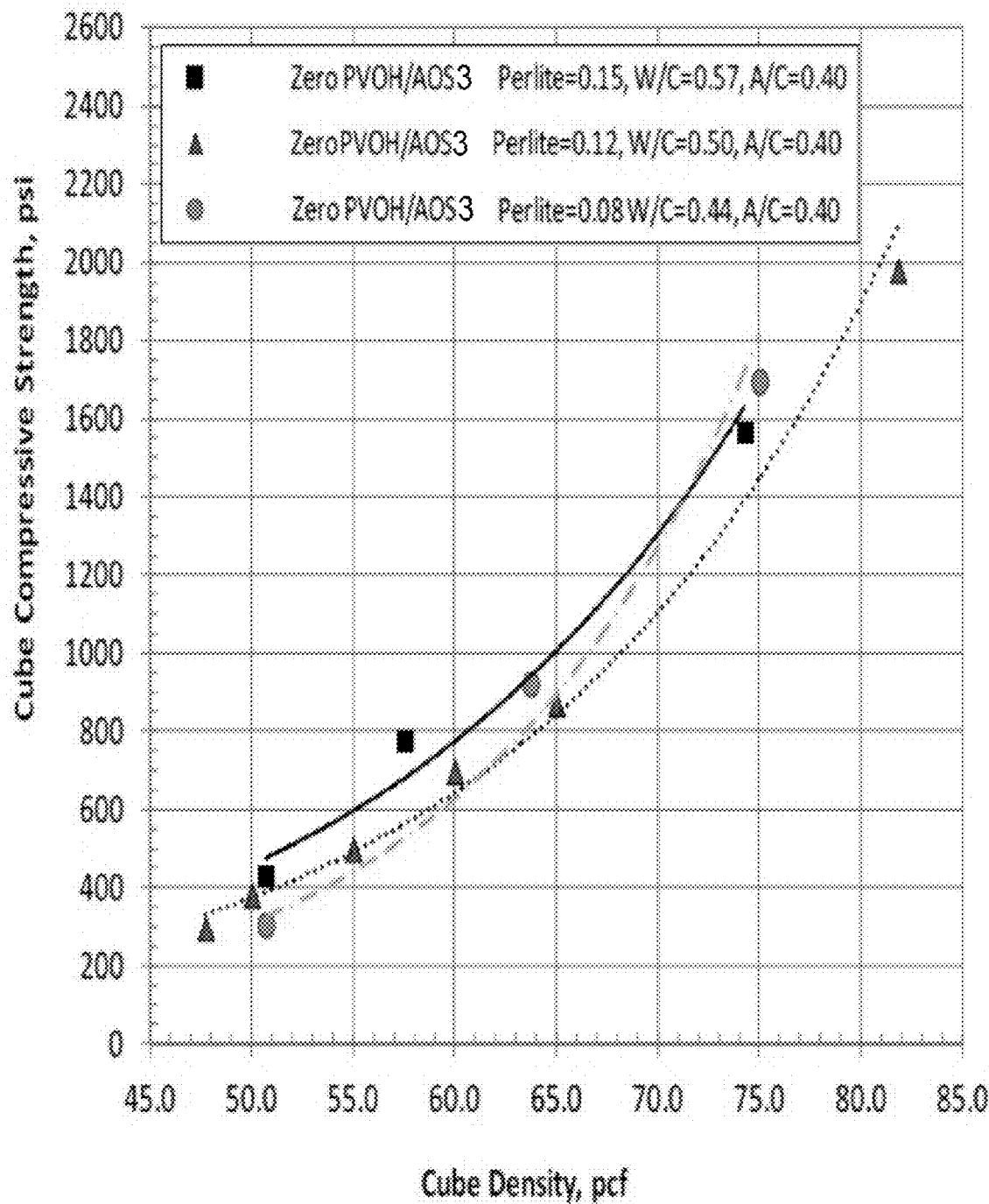
FIG. 1C shows a summary of compressive strength data for mixtures with perlite:cement ratio.

The goal of evaluating the current mixtures was to find out if reducing the foam volume by increasing perlite content would lead to increased compressive strengths. Mixture proportions included in TABLES 3 and 4 were used for this example with the purpose to study the compressive strength as a function of density for mixtures with various perlite/cement ratios. FIG. 1C shows the graphs for the data points obtained at the low end of the density range. Each data point is the average of six cube specimens. The line fit for each set of data was estimated using a graphics program and was included in TABLE 3 for mixtures with perlite to cement wt. ratio of 0.15:1, and in TABLE 4 for mixtures with perlite to cement wt. ratios of 0.12:1, and 0.08:1.

FIG. 1C summarizes compressive strength data for mixtures at various perlite:cement weight ratios. It shows increasing perlite fails to increase compressive strength. Mixtures with various perlite ratios behave similarly in that the cube compressive strength response as a function of density appears to be independent of perlite content. It is theorized this behavior results because the increased perlite mixtures have a higher water to cement ratio, thus the benefit of adding perlite is reduced by the need of increased water content.

TABLE 3 shows Example 1 data for mixtures included in FIG. 1C with perlite to cement ratio of 0.12:1 and using an AOS (alpha olefin sulfonate) soap as the foaming agent (all amounts in tables of compositions for this and other examples of this specification are in grams unless otherwise indicated). The AOS soap of this example is designated AOS3.

TABLE 3

|  | 1 | 2 | 3 |
| --- | --- | --- | --- |
| Effective W/C Ratio | 0.570 | 0.570 | 0.570 |
| Type III Portland cement, g | 490.04 | 482.76 | 482.76 |
| Class C Fly Ash, g | 147.01 | 144.83 | 144.83 |
| Land Plaster, g | 73.51 | 72.41 | 72.41 |
| Triethanolamine (85%), g | 1.59 | 1.56 | 1.56 |
| STMP (Solid), g | 1.42 | 1.40 | 1.40 |
| Sodium Citrate (Solid), g | 1.78 | 1.75 | 1.75 |
| Superplasticizer PCE(40%), g | 7.11 | 7.00 | 7.00 |
| PVOH (2% solution), g | 0 | 0 | 0 |
| Foam Water, g | 0 | 20 | 40 |
| AOS3 soap foaming agent, g | 0 | 0.8 | 1.6 |
| Foam Volume, % | 1.3 | 28.7 | 41.8 |
| Expanded clay aggregate, g | 284 | 280 | 280 |
| Coated perlite (glass micro cellular fillers), g | 85.27 | 84.00 | 84.00 |
| Total batch size, g | 1414.0 | 1414.0 | 1414.0 |
| Batch volume, mL | 1128.3 | 1567.2 | 1914.0 |
| Wet (water included) Slurry Density, pcf | 78.2 | 56.3 | 46.1 |
| Cube Density, pcf | 81.8 | 61.2 | 47.7 |
| Cube Compressive Strength, psi | 1982 | 873 | 298 |
| Young's Modulus, ksi | 239 | 144 | 39 |

TABLE 4 shows Example 1 data for mixtures included in FIG. 1C with perlite to cement wt. ratio of 0.15:1 (mixtures 1-3), and for mixtures with perlite to cement wt. ratio of 0.08:1 (mixtures 4-6). In this and other tables W/C is water to cement weight ratio.

TABLE 4

|  | 1 | 2 | 3 | 4 | 5 | 6 |
| --- | --- | --- | --- | --- | --- | --- |
| Effective W/C Weight Ratio | 0.570:1 | 0.570:1 | 0.600:1 | 0.470:1 | 0.47:1 | 0.47:1 |
| Type III Portland cement | 459.99 | 459.99 | 453.57 | 500.09 | 500.1 | 500.1 |

TABLE 4-continued

|  | 1 | 2 | 3 | 4 | 5 | 6 |
| --- | --- | --- | --- | --- | --- | --- |
| Class C Fly Ash, | 138.00 | 138.00 | 136.07 | 150.03 | 150.0 | 150.0 |
| Land Plaster | 69.00 | 69.00 | 68.04 | 75.01 | 75.0 | 75.0 |
| Triethanolamine (85%) | 1.49 | 1.49 | 1.47 | 1.62 | 1.62 | 1.62 |
| STMP (Solid) | 1.33 | 1.33 | 1.32 | 1.45 | 1.45 | 1.45 |
| Sodium Citrate (Solid) | 1.67 | 1.67 | 1.64 | 1.81 | 1.81 | 1.81 |
| Superplasticizer SIKA G-2 | 6.67 | 6.67 | 6.58 | 7.25 | 7.25 | 7.25 |
| PVOH (2% solution), g | 0 | 0 | 0 | 0 | 0 | 0 |
| Foam Water, g | 0 | 20 | 40 | 0 | 20 | 40 |
| AOS3 soap, g | 0 | 0.8 | 1.6 | 0 | 0.8 | 1.6 |
| Foam Volume, % | 2.5 | 23.9 | 40.7 | 32.9 | 27.9 | 51.9 |
| Expanded Clay Aggregate | 267 | 267 | 263 | 290 | 290 | 290 |
| Coated perlite | 100.05 | 100.05 | 98.65 | 58.01 | 58.01 | 58.01 |
| Total batch size, g | 1414.0 | 1414.0 | 1414.0 | 1414.0 | 1414.0 | 1414.0 |
| Batch volume, mL | 1210.3 | 1545.3 | 1991.7 | 1039.3 | 1398.1 | 2090.8 |
| Wet Slurry Density, pcf | 72.9 | 57.1 | 44.3 | 84.9 | 63.1 | 42.2 |
| Cube Density, pcf | 74.3 | 57.5 | 50.7 | 86.8 | 63.7 | 50.7 |
| Cube Compressive Strength, psi | 1569 | 780 | 432 | 3598 | 924 | 307 |
| Young's Modulus, ksi | 209 | 139 | 90 | 274 | 151 | 52 |

Example 2

Figure 2:
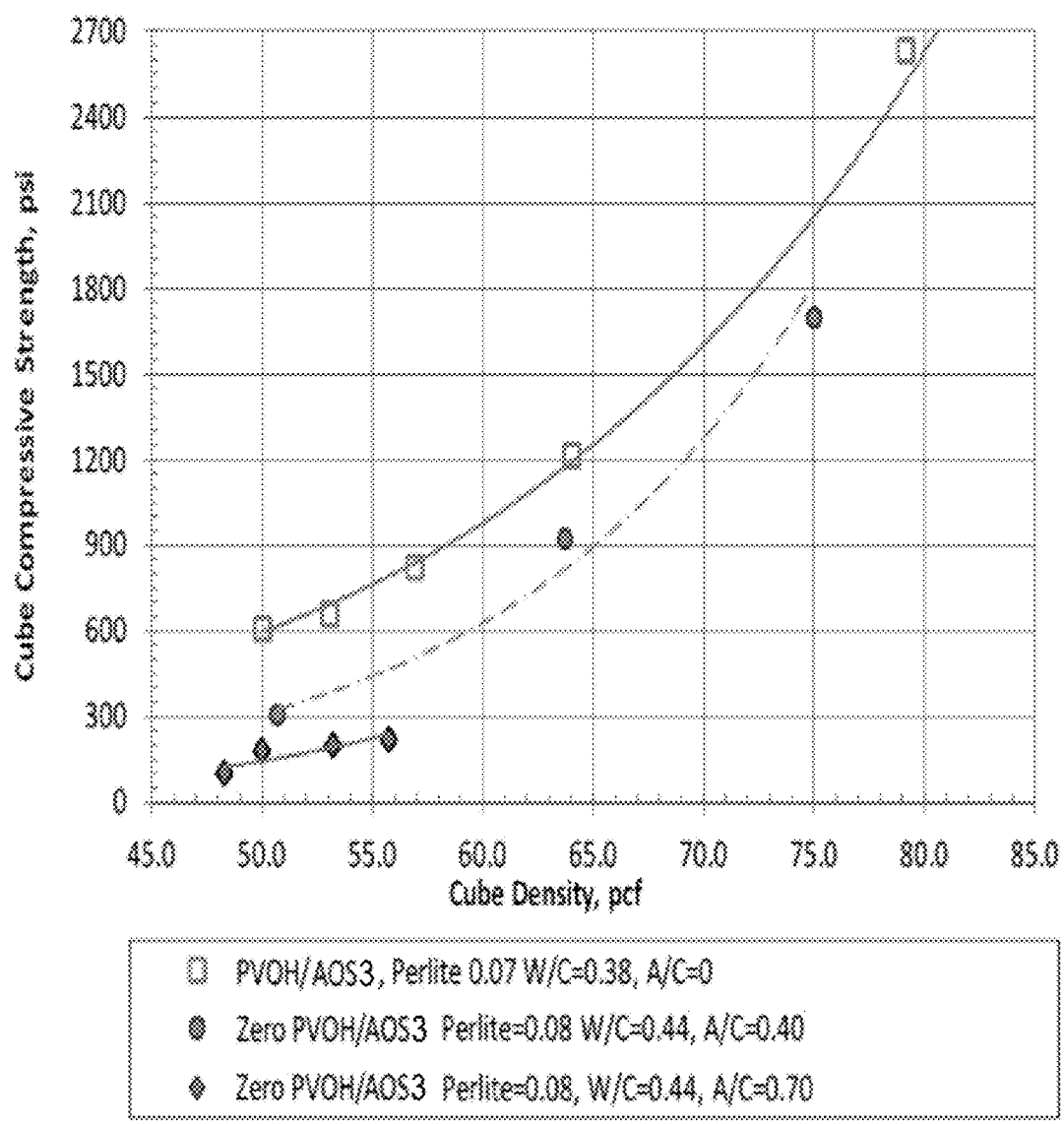
FIG. 2 shows compressive strength as a function of density for mixtures with various aggregate to cement (A/C) ratios.

Mixture proportions used for this example with various aggregate to cement (A/C) wt. ratios, were used to evaluate the effect of expanded clay aggregate content on the compressive strength as a function of mix density. TABLE 4 (Mixtures 4-6) includes mixture proportions and summary of data for specimens of Example 1 with A/C=0.4:1. TABLES 5 and 6 include the same data for mixtures of Example 2 with A/C=0.70:1 and A/C=0:1, respectively. FIG. 2 shows compressive strength as a function of density for mixtures with various aggregate to cement (A/C) weight ratios. It includes the strength versus density response for these mixtures as well as the line fit for each set of data.

The data shows increasing expanded clay aggregate from A/C=0.4:1 to A/C=0.7:1 resulted in mixtures with reduced compressive strength. It is theorized the open porosity nature of the expanded clay aggregate allows for the absorption of the cement/water binders which leads to an increase of the in-situ density of the expanded clay aggregate. This tendency to absorb the surrounding cementitious binder leads to inefficiency in lowering the density which then requires the use of increased foam usage at a cement level that is lacking to coat the foam bubbles. The end result is mixtures with increased content of expanded clay aggregate are unable to meet the desired compressive strength at relatively lower densities.

TABLE 5

Example 2 for mixtures included in FIG. 2 with aggregate/cement wt. ratio of 0.70:1 using AOS3 soap (surfactant)

|  | 1 | 2 | 3 |
| --- | --- | --- | --- |
| Effective W/C Ratio | 0.500:1 | 0.500:1 | 0.500:1 |
| Type III Portland cement, g | 473.69 | 473.69 | 473.69 |

TABLE 5-continued

Example 2 for mixtures included in FIG. 2 with aggregate/cement wt. ratio of 0.70:1 using AOS3 soap (surfactant)

|  | 1 | 2 | 3 |
|---|---|---|---|
| Class C Fly Ash, g | 142.11 | 142.11 | 142.11 |
| Land Plaster, g | 56.84 | 56.84 | 56.84 |
| Triethanolamine (85%) | 1.19 | 1.19 | 1.19 |
| STMP (Solid), g | 0.78 | 0.78 | 0.78 |
| Sodium Citrate (Solid), g | 1.68 | 1.68 | 1.68 |
| Superplasticizer PCE(40% solution), g | 6.73 | 6.73 | 6.73 |
| PVOH (2% solution), g | 0 | 0 | 0 |
| Foam Water, g | 50 | 30 | 40 |
| AOS3 soap, g | 2 | 1.6 | 1.8 |
| Foam Volume, % | 45.4 | 37.0 | 37.0 |
| Expanded Clay Aggregate | 471 | 471 | 471 |
| Coated perlite, g | 53.81 | 53.81 | 53.81 |
| Total Batch Size, g | 1500.0 | 1500.0 | 1500.0 |
| Batch volume, mL | 1937.9 | 1680.4 | 1680.4 |
| Wet Slurry density, pcf | 44.3 | 55.2 | 52.9 |
| Cube Density, pcf | 48.3 | 55.7 | 53.2 |
| Cube Compressive Strength, psi | 102.7 | 219.9 | 200 |
| Young's Modulus, ksi | 38 | 57 | 48 |

In an effort to improve the strength as the density is reduced and achieve a compressive strength of at least 600 psi the inventor discovered it is desirable to use mixtures without the clay aggregate as indicated by the data summarized in TABLE 6 for mixtures with an aggregate to cement weight ratio A/C=0:1. A solution with polyvinyl alcohol (PVOH) was added to these mixtures without lightweight aggregate to make the foam. This was done to increase the foam stability and to make foam with small micro-bubbles which would not break when the foam is added to the cementitious binder.

The foam water had 2 wt. % PVOH.

TABLE 6

Example 2 for mixtures included in FIG. 2 with A/C = 0 using soap

|  | 1 | 2 | 3 | 4 | 5 |
|---|---|---|---|---|---|
| Effective Water:Cement wt. Ratio | 0.380:1 | 0.380:1 | 0.380:1 | 0.380:1 | 0.380:1 |
| Type III Portland cement, g | 728.51 | 728.51 | 728.51 | 728.51 | 728.51 |
| Class C Fly Ash, g | 218.55 | 218.55 | 218.55 | 218.55 | 218.55 |
| Landplaster, g | 87.42 | 87.42 | 87.42 | 87.42 | 87.42 |
| Triethanolamine (85%), g | 1.83 | 1.83 | 1.83 | 1.83 | 1.83 |
| STMP (Solid), g | 1.03 | 1.03 | 1.03 | 1.03 | 1.03 |
| Sodium citrate (Solid), g | 2.59 | 2.59 | 2.59 | 2.59 | 2.59 |
| Superplasticizer PCE (40% solution) | 10.34 | 10.34 | 10.34 | 10.34 | 10.34 |
| PVOH (2% solution), g | 10 | 20 | 30 | 40 | 50 |
| Foam Water, g | 0 | 0 | 0 | 0 | 0 |
| AOS3 soap, g | 0.5 | 1.0 | 2.5 | 3.5 | 4.0 |
| Foam Volume, % | 3.7 | 16.2 | 31.4 | 37.8 | 41.4 |
| Expanded Clay Aggregate, g | 0 | 0 | 0 | 0 | 0 |
| Coated perlite, g | 72.41 | 72.41 | 72.41 | 72.41 | 72.41 |
| Total Batch Size, g | 1500.0 | 1500.0 | 1500.0 | 1500.0 | 1500.0 |
| Batch volume, mL | 1072.2 | 1233.2 | 1497.6 | 1665.5 | 1762.7 |
| Cube Density, pcf | 87.0 | 79.1 | 64.0 | 56.9 | 53.0 |
| Cube Compressive Strength, psi | 3568 | 2637 | 1404 | 827 | 663 |
| Young's Modulus, ksi | 324 | 268 | 172 | 137 | 87 |
| Wet Slurry Density, pcf | 87.3 | 75.9 | 62.5 | 56.2 | 53.1 |

Example 3

The next series of mixtures were made without using the expanding lightweight aggregate, and using a blend of the PVOH (2%) solution pre-mixed with various foaming agents and then aerated to form the required amount of foam that would yield cube specimens with varied densities. The cube specimens were then cured for 7 days in a room with controlled temperature of 90° F. and relative humidity of 90%. TABLE 6 includes the proportions for mixtures with A/C=0:1 using a sodium lauryl ethoxy sulfate (SLS) surfactant as foaming agent.

Figure 3A:
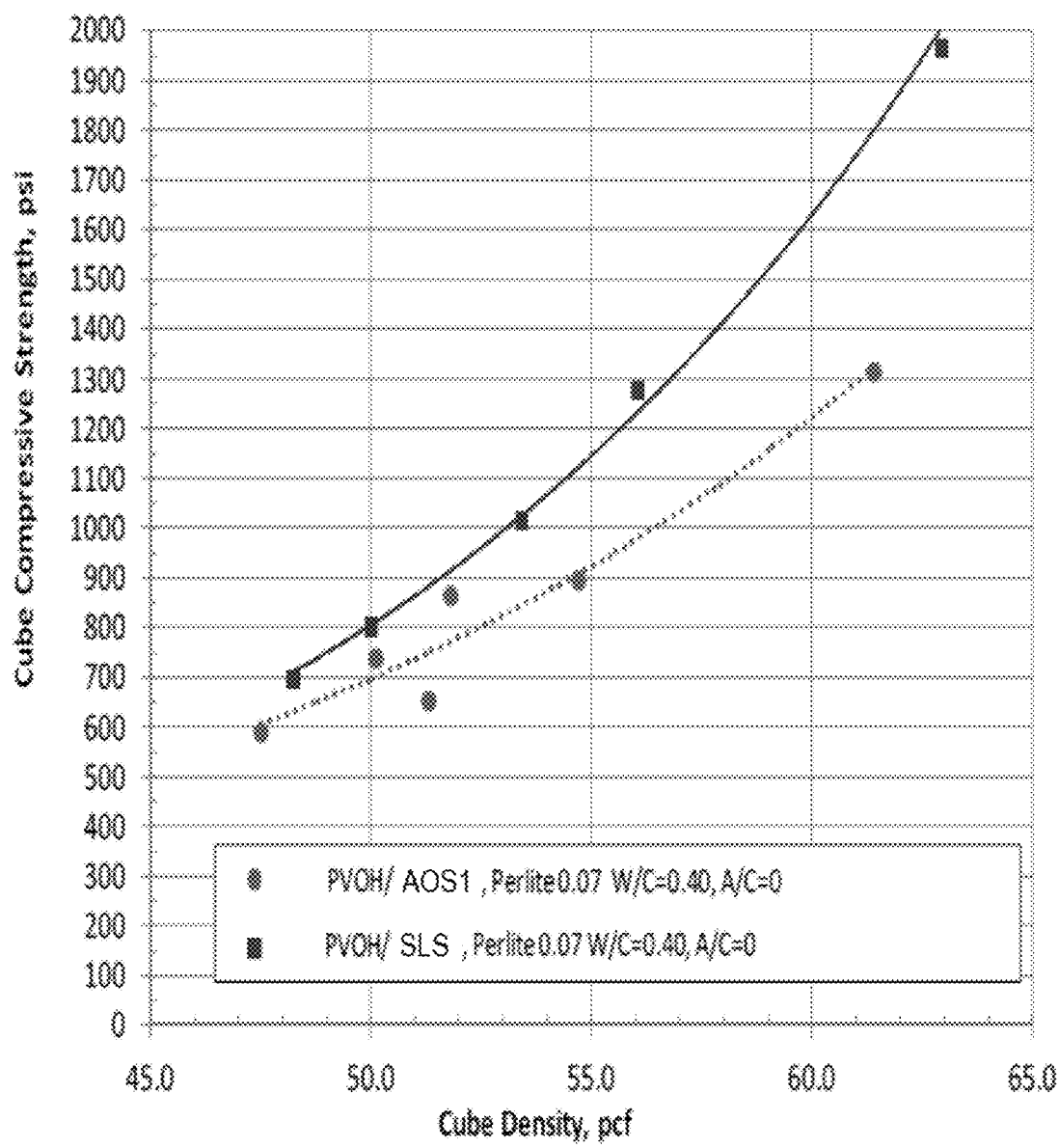
FIG. 3A shows a summary of compressive strength measured for mixtures using blend of PVOH/alpha olefin sulfonate (AOS) foaming agent labeled AOS1 compared to mixtures using blend of PVOH/sodium lauryl ethoxy sulfate soap (SLS) as foaming agents.

First this example compared mixtures with AOS1 soap and mixtures with SLS soap. TABLE 7 includes mixture proportions and data obtained for the series with AOS1 foaming agent. TABLE 8 includes mixture proportions and summary of data for series with SLS soap foaming agent. FIG. 3A shows the summary of compressive strength measured for these foamed cement mixtures using a blend of PVOH/AOS foaming agent compared to mixtures using a blend of PVOH/SLS as foaming agents without expanded clay lightweight aggregate. FIG. 3 indicated similar compressive strength in the range of 700 to 800 psi for mixtures with 50 pcf density for the series of mixtures with both foaming agents.

However, the data included in FIG. 3A indicated that mixtures with the sodium lauryl ethoxy sulfate soap foaming agent measured relatively higher compressive strength compared with mixtures with the AOS1 soap as the density of the cube specimens increased.

TABLE 7

Example 3 for mixtures with - AOS1 soap (surfactant) as foaming agent included in FIG. 3A

|  | 1 | 2 | 3 | 4 | 5 | 6 |
|---|---|---|---|---|---|---|
| Effective W/C Ratio | 0.400:1 | 0.400:1 | 0.400:1 | 0.400:1 | 0.400:1 | 0.400:1 |
| Type III Portland cement | 718.60 | 718.60 | 718.60 | 718.60 | 718.60 | 718.60 |
| Class C Fly Ash | 215.58 | 215.58 | 215.58 | 215.58 | 215.58 | 215.58 |
| Land Plaster | 86.23 | 86.23 | 86.23 | 86.23 | 86.23 | 86.23 |
| Triethanolamine (85%) | 1.80 | 1.80 | 1.80 | 1.80 | 1.80 | 1.80 |
| STMP (Solid) | 1.02 | 1.02 | 1.02 | 1.02 | 1.02 | 1.02 |
| Sodium Citrate (Solid) | 2.55 | 2.55 | 2.55 | 2.55 | 2.55 | 2.55 |
| Superplasticizer PCE (40%) | 10.20 | 10.20 | 10.20 | 10.20 | 10.20 | 10.20 |
| PVOH (2% solution), g | 50 | 60 | 50 | 20 | 50 | 50 |
| Foam Water, g | 0 | 0 | 0 | 0 | 0 | 0 |
| AOS1 soap, g | 5 | 6 | 6 | 3 | 4 | 5 |
| Foam Volume, % | 41.7 | 47.9 | 44.4 | 31.6 | 25.3 | 28.6 |
| Expanded Clay Aggregate | 0 | 0 | 0 | 0 | 0 | 0 |
| Coated perlite | 71.43 | 71.43 | 71.43 | 71.43 | 81.08 | 81.08 |
| Total Batch Size, g | 1500.0 | 1500.0 | 1500.0 | 1500.0 | 1500.0 | 1500.0 |
| Batch volume, mL | 1772.7 | 1983.1 | 1868.3 | 1517.0 | 1752.8 | 1898.6 |
| Cube Density, pcf | 51.8 | 47.5 | 51.3 | 61.4 | 54.7 | 50.1 |
| Cube Compressive Strength, psi | 867 | 593 | 656 | 1317 | 899 | 741 |
| Young's Modulus, ksi | 99 | 54 | 82 | 74 | 99 | 82 |
| Wet Slurry Density, pcf | 52.8 | 47.2 | 50.4 | 61.7 | 53.4 | 49.3 |

TABLE 8

Mixtures for Example 3 using SLS soap (surfactant) as foaming agent included in FIG. 3A

|  | 1 | 2 | 3 | 4 |
|---|---|---|---|---|
| Effective W/C Ratio | 0.400:1 | 0.400:1 | 0.400:1 | 0.400:1 |
| Type III portland cement | 704.23 | 704.23 | 704.23 | 704.23 |
| Class C Fly Ash, | 211.27 | 211.27 | 211.27 | 211.27 |
| Land Plaster | 84.51 | 84.51 | 84.51 | 84.51 |
| Triethanolamine (85%) | 1.76 | 1.76 | 1.76 | 1.76 |
| STMP (solid) | 1.00 | 1.00 | 1.00 | 1.00 |
| Sodium Citrate (Solid) | 2.50 | 2.50 | 2.50 | 2.50 |
| Superplasticizer PCE (40%) | 10.00 | 10.00 | 10.00 | 10.00 |
| PVOH (2% solution), g | 10 | 20 | 30 | 40 |
| Foam Water, g | 0 | 0 | 0 | 0 |
| SLS soap, g | 0.5 | 1 | 1.5 | 2.6 |
| Foam Volume, % | 26.1 | 35.3 | 36.8 | 44.2 |
| Expanded Clay Aggregate | 0 | 0 | 0 | 0 |
| Coated perlite | 100.0 | 100.0 | 100.0 | 100.0 |
| Total Batch Size, g | 1500.0 | 1500.0 | 1500.0 | 1500.0 |
| Batch volume, mL | 1531.9 | 1756.1 | 1793.1 | 2034.8 |
| Cube Density, pcf | 62.9 | 56.0 | 53.4 | 48.2 |
| Cube Compressive Strength, psi | 1969 | 1281 | 1019 | 700 |
| Young's Modulus, ksi | 188 | 151 | 128 | 113 |
| Wet Slurry Density, pcf | 61.1 | 53.3 | 52.2 | 46.0 |

Figure 3B:
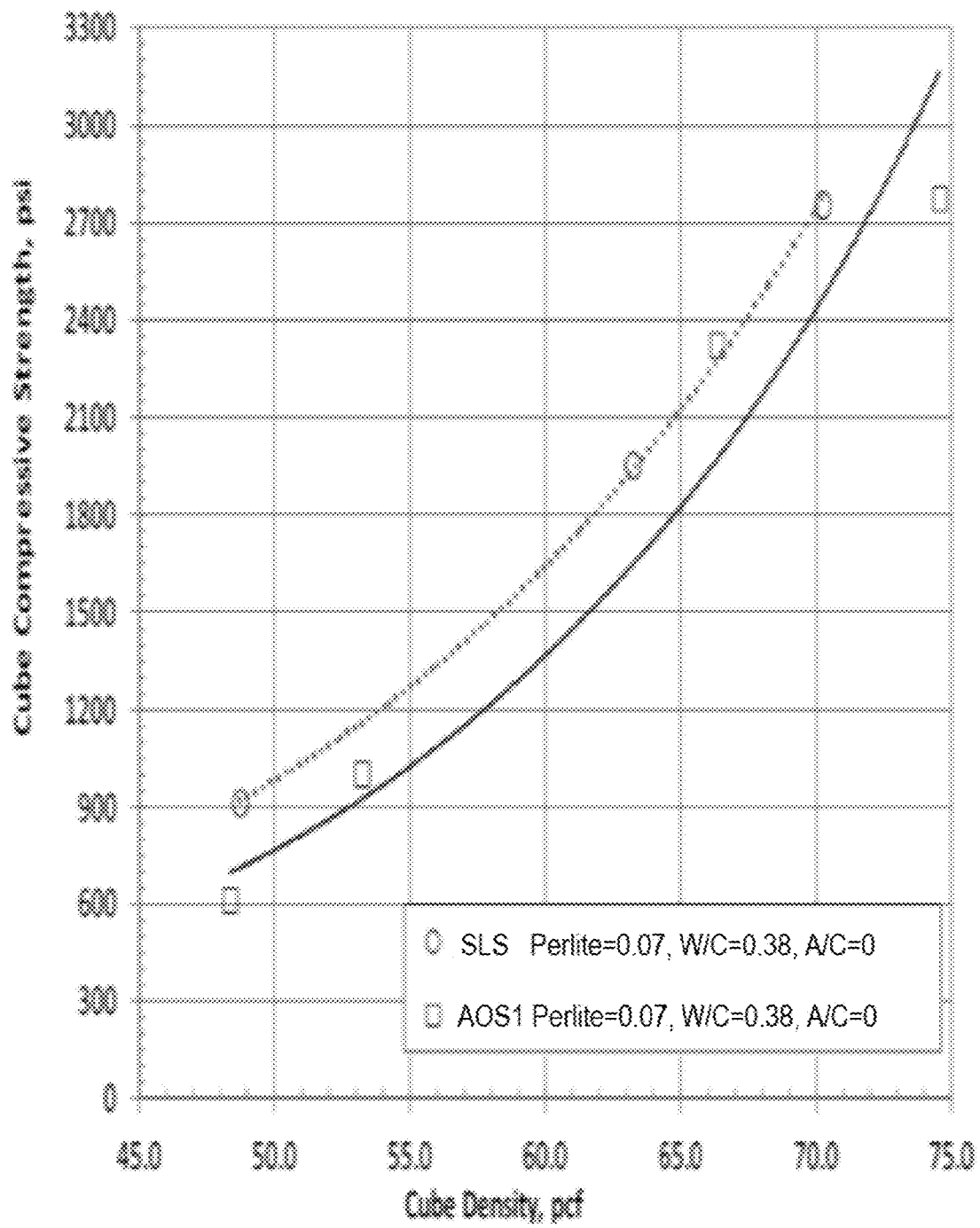
FIG. 3B shows a summary of compressive strength measured for mixtures without PVOH with AOS1 soap compared to mixtures using Sodium Laureth Ether Sulfate soap as foaming agents.

A similar comparison was made for mixtures which replaced the PVOH with plain water and used the AOS1 soap or the SLS soap as the sole foaming agents. The mixture proportions and cube compressive strength data are included in TABLE 9 and TABLE 10 and summarized in FIG. 3B. Thus, FIG. 3B shows a summary of compressive strength for mixtures without PVOH with AOS1 compared to mixtures using SLS as foaming agents. This indicated again mixtures with the SLS soap with average compressive strengths at 50 pcf around 980 psi performed noticeable better compared to mixtures with the AOS soap for which the average compressive strengths at the same 50 pcf density was measured at around 760 psi.

TABLE 9

Mixtures for Example 3 using AOS1 soap included in FIG. 3B

|  | 1 | 2 | 3 | 4 |
|---|---|---|---|---|
| Effective W/C Ratio | 0.380:1 | 0.380:1 | 0.380:1 | 0.380:1 |
| Type III portland cement | 728.51 | 728.51 | 728.51 | 728.51 |
| Class C Fly Ash, | 218.55 | 218.55 | 218.55 | 218.55 |
| Land Plaster | 87.42 | 87.42 | 87.42 | 87.42 |
| Triethanolamine (85%) | 1.83 | 1.83 | 1.83 | 1.83 |
| STMP (solid) | 1.03 | 1.03 | 1.03 | 1.03 |
| Sodium Citrate (Solid) | 2.59 | 2.59 | 2.59 | 2.59 |
| Superplasticizer PCE(40%) | 10.34 | 10.34 | 10.34 | 10.34 |
| PVOH (2% solution), g | 0 | 0 | 0 | 0 |
| Foam Water, g | 10 | 20 | 40 | 50 |
| AOS1 soap, g | 1.0 | 3.0 | 5.0 | 6.0 |
| Foam Volume, % | 20.2 | 28.0 | 43.0 | 48.2 |
| Aggregate | 0 | 0 | 0 | 0 |
| Coated perlite | 72.41 | 72.41 | 72.41 | 72.41 |
| Total Batch Size, g | 1500.0 | 1500.0 | 1500.0 | 1500.0 |
| Batch volume, mL | 1288 | 1427 | 1812 | 1992 |
| Cube Density, pcf | 74.6 | 66.3 | 53.2 | 48.3 |
| Cube Compressive Strength, psi | 2780 | 2328 | 1006 | 617.5 |
| Young's Modulus, ksi | 258 | 217 | 141 | 109 |
| Wet Slurry Density, pcf | 72.7 | 65.6 | 51.7 | 47.0 |

TABLE 10

Mixtures for Example 3 using sodium lauryl ethoxy sulfate (SLS) included in FIG. 3B

|  | 1 | 2 | 3 |
|---|---|---|---|
| Effective W/C wt. Ratio | 0.380:1 | 0.380:1 | 0.380:1 |
| Type III Portland cement | 728.51 | 728.51 | 728.51 |
| Class C Fly Ash, | 218.55 | 218.55 | 218.55 |
| Land Plaster | 87.42 | 87.42 | 87.42 |
| Triethanolamine (85%) | 1.83 | 1.83 | 1.83 |
| STMP (solid) | 1.03 | 1.03 | 1.03 |
| Sodium Citrate (Solid) | 2.59 | 2.59 | 2.59 |
| Superplasticizer PCE (40%) | 10.34 | 10.34 | 10.34 |
| PVOH (2% solution), g | 0 | 0 | 0 |
| Foam Water, g | 10 | 20 | 40 |
| sodium lauryl ethoxy sulfate (SLS) soap, g | 0.5 | 1.0 | 2.0 |
| Foam Volume, % | 23.7 | 31.6 | 47.4 |
| Expanded Clay Aggregate | 0 | 0 | 0 |
| Coated perlite (glass micro cellular fillers) | 72.41 | 72.41 | 72.41 |
| Total Batch Size, g | 1500.0 | 1500.0 | 1500.0 |
| Batch volume, mL | 1350 | 1520 | 1960 |
| Cube Density, pcf | 70.2 | 63.2 | 48.7 |
| Cube Compressive Strength, psi | 2760 | 1957 | 918 |
| Young's Modulus, ksi | 244 | 193 | 117 |
| Wet Slurry Density, pcf | 69.5 | 61.8 | 47.7 |

This Example also studied the proposed formulations without lightweight aggregate containing PVOH foam stabilizer and foamed with two other alpha olefin sulfonate (AOS) soaps identified as AOS2 or AOS3. AOS2 soap (surfactant) is Ammonium C10-C12 alcohol ether sulfate and AOS3 is Sodium C14-16 Olefin Sulfonate.

TABLE 11 includes a series of mixtures of PVOH foam stabilizer and SLS soap foaming agent. The tested SLS soap is sodium lauryl ethoxy sulfate, namely sodium polypropoxy-polyethoxy-decyl sulfate (molecular formula $C_{10}H_{22}$—$O(C_3H_6$—$OC_2H_4$—$O)_x$—$H_2SO_4$—Na).

TABLE 12 includes a series of mixtures of PVOH foam stabilizer and AOS2 ammonium C10-C12 alcohol ether sulfate soap. These mixtures were compared with mixtures shown in TABLE 6 of Example 2 containing mixtures of PVOH foam stabilizer and a different AOS soap (AOS1).

Figure 3C:
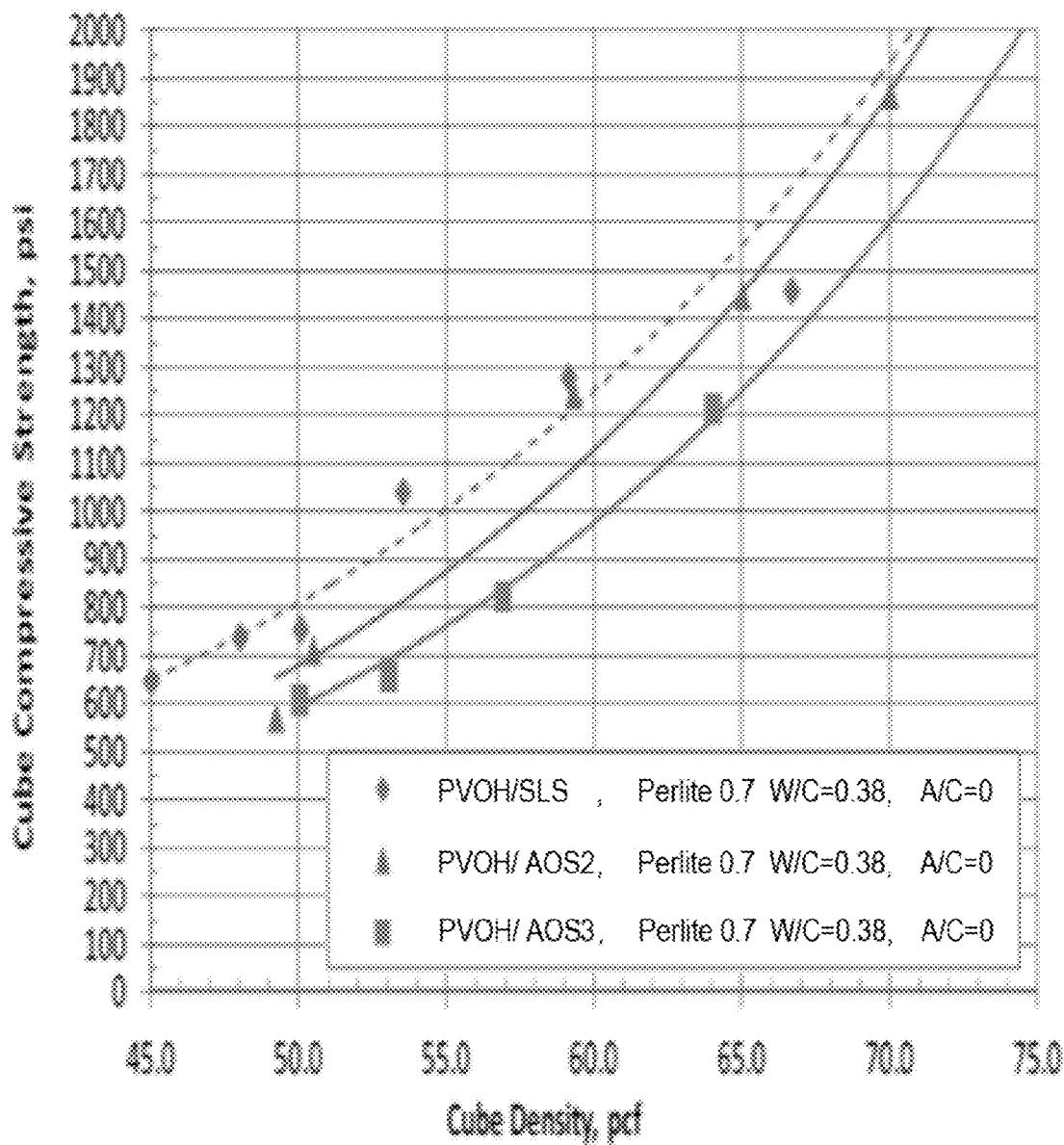
FIG. 3C Shows a summary of compressive strength measured for mixtures using Sodium Laureth Sulfate Ether soap compared to mixtures foamed using Ammonium C10-C12 alcohol ether sulfate soap (AOS2) and Sodium C14-16 Olefin Sulfonate soap (AOS3) as foaming agents of Example 3.

FIG. 3C compared the compressive strength versus density measured for foamed cement mixtures with water to cement ratio of 0.38:1 foamed using PVOH and SLS soap with mixtures foamed using PVOH and ammonium C10-C12 alcohol ether sulfate soap (AOS2) or PVOH and Sodium C14-16 Olefin Sulfonate soap (AOS3). The mixtures with the SLS soap measured slightly higher compressive strength with an average of 800 psi for mixtures with a 50 pcf density compared to 600-700 psi for mixtures with the AOS2 and the AOS3 soaps.

This data indicated foamed cement mixtures without lightweight aggregate using blends of the PVOH/AOS2 and/or blends of the PVOH/AOS3 foamed cement mixtures (zero aggregate) may be manufactured with the required compressive strengths (minimum of 600 psi and 50 pcf).

However, specimens made with AOS1 soap of Example 2 and the SLS soap measured compressive strength around 750-980 psi for mixtures with density of 50 pcf. This is relatively higher compared to around 600 psi compressive strengths obtained for specimens made with blends of PVOH and AOS2 soap or PVOH and AOS3 soap.

TABLE 11

Example 3 for mixtures with SLS included in FIG. 3C

|  | 1 | 2 | 3 | 4 | 5 |
|---|---|---|---|---|---|
| Effective W/C Ratio | 0.380:1 | 0.380:1 | 0.380:1 | 0.380:1 | 0.380:1 |
| Type III Portland cement, g | 728.51 | 728.51 | 728.51 | 728.51 | 728.51 |
| Class C Fly Ash, g | 218.55 | 218.55 | 218.55 | 218.55 | 218.55 |
| Land Plaster, g | 87.42 | 87.42 | 87.42 | 87.42 | 87.42 |
| Triethanolamine (85%) | 1.83 | 1.83 | 1.83 | 1.83 | 1.83 |
| STMP (Solid) | 1.03 | 1.03 | 1.03 | 1.03 | 1.03 |
| Sodium citrate (Solid) | 2.59 | 2.59 | 2.59 | 2.59 | 2.59 |
| Superplasticizer PCE (40%) | 10.34 | 10.34 | 10.34 | 10.34 | 10.34 |
| PVOH (2% solution), g | 0 | 20 | 30 | 40 | 50 |
| Foam Water, g | 0 | 0 | 0 | 0 | 0 |
| SLS soap, g | 0 | 1 | 1.5 | 2 | 3 |
| Foam Volume, % | 6.4 | 28.0 | 36.0 | 40.7 | 44.9 |
| Aggregate | 0 | 0 | 0 | 0 | 0 |
| Coated perlite | 72.41 | 72.41 | 72.41 | 72.41 | 72.41 |
| Total Batch Size, g | 1500.0 | 1500.0 | 1500.0 | 1500.0 | 1500.0 |
| Batch volume, mL | 1096.0 | 1429.0 | 1611.0 | 1743.0 | 1872.0 |
| Cube Density, pcf | 88.3 | 66.7 | 59.1 | 53.5 | 50.1 |
| Cube Compressive Strength, psi | 4433 | 1462 | 1282 | 1044 | 758 |
| Young's Modulus, ksi | 237 | 180 | 143 | 131 | 104 |
| Wet Slurry Density, pcf | 85.4 | 65.5 | 58.1 | 53.7 | 50.0 |

TABLE 12

Example 3 for mixtures with AOS2 (alcohol ether sulfate) soap foaming agent included in FIG. 3C

|  | 1 | 2 | 3 | 4 |
|---|---|---|---|---|
| Effective W/C Ratio | 0.380 | 0.380 | 0.380 | 0.380 |
| Type III Portland cement, g | 728.51 | 728.51 | 728.51 | 728.51 |
| Class Fly Ash, g | 218.55 | 218.55 | 218.55 | 218.55 |
| Land Plaster, g | 87.42 | 87.42 | 87.42 | 87.42 |
| Triethanolamine (85%), g | 1.83 | 1.83 | 1.83 | 1.83 |
| STMP (Solid), g | 1.03 | 1.03 | 1.03 | 1.03 |
| Sodium citrate (Solid), g | 2.59 | 2.59 | 2.59 | 2.59 |
| Superplasticizer PCE(40%), g | 10.34 | 10.34 | 10.34 | 10.34 |
| PVOH (2% solution), g | 0 | 20 | 40 | 30 |
| Foam Water, g | 0 | 0 | 0 | 0 |
| AOS2 soap foaming agent, g | 0 | 1 | 2.2 | 1.5 |
| Foam Volume, % | 5.5 | 40.4 | 50.6 | 46.5 |
| Aggregate | 0 | 0 | 0 | 0 |
| Coated perlite | 72.41 | 72.41 | 72.41 | 72.41 |
| Total Batch Size, g | 1500.0 | 1500.0 | 1500.0 | 1500.0 |
| Batch volume, mL | 1090.9 | 1733.3 | 2094.0 | 1933.9 |
| Cube Density, pcf | 88.5 | 59.3 | 49.2 | 50.5 |
| Cube Compressive Strength, psi | 4592 | 1249 | 575 | 716 |
| Young's Modulus, ksi | 371 | 143 | 82 | 110 |
| Wet Slurry Density, pcf | 85.8 | 54.0 | 44.7 | 48.4 |

Example 4

Figure 4:
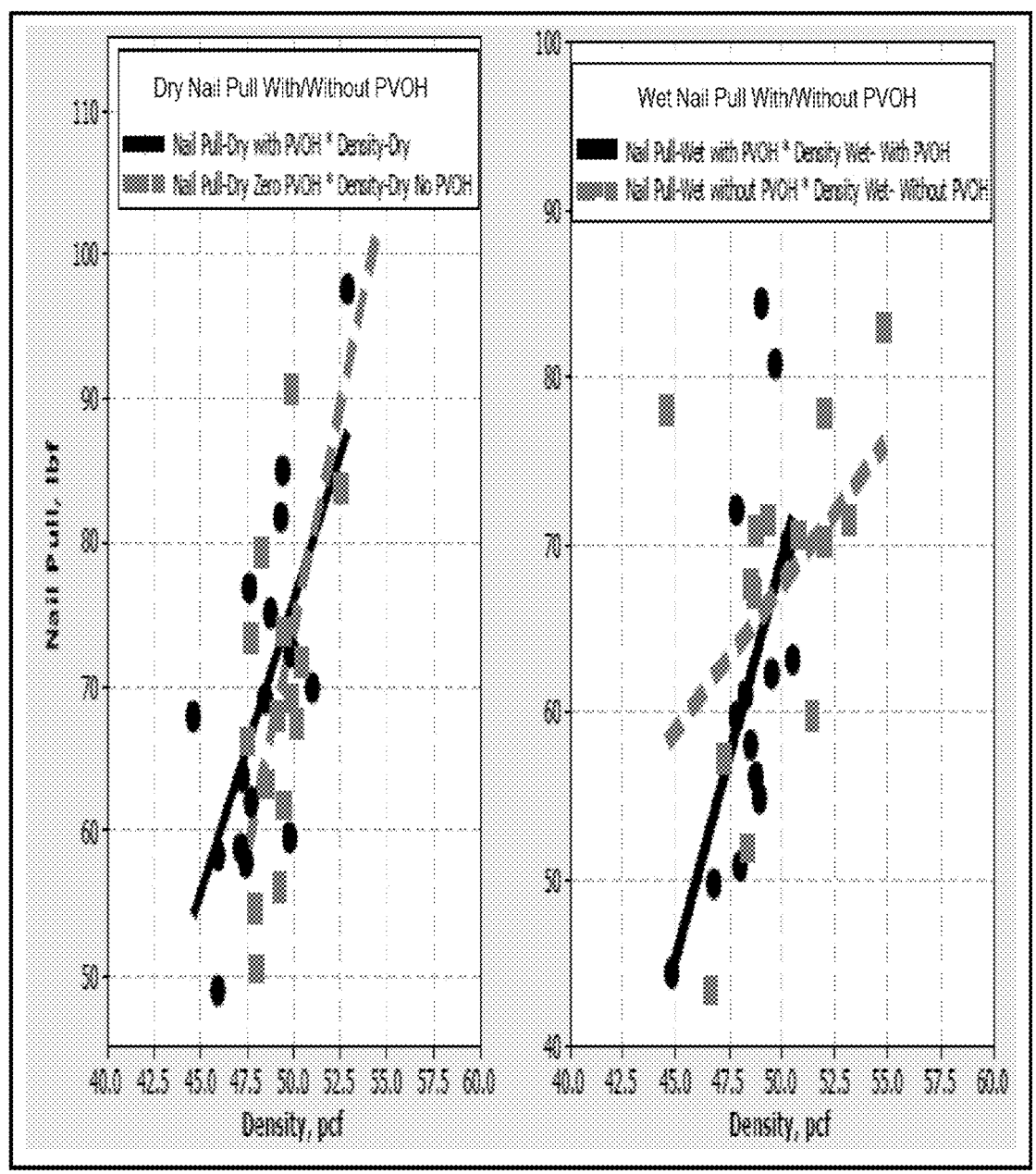
FIG. 4 shows nail pull data for Example 4 for panel mixtures of Example 4.

The next series of mixtures A and B were made using expanded lightweight aggregate, and using a blend of the PVOH (2%) solution pre-mixed with various foaming agents and then aerated to form the required amount of foam that would yield cube specimens with varied densities. The lab panels (½"×3'×1') were then cured for 14 days in a room with controlled temperature of 90° F. and relative humidity of 90%. FIG. 4 shows the summary of nail pull values measured for these foamed cement panel mixture samples while dry and after water immersion and TABLE 13 include the proportions for mixtures with A/C=0.40 using AOS1 as the foaming agent. It shows an average of the two respective mixtures for each data point. Overall, this example did not measure a significant difference between samples with or without PVOH in this case. This indicated the foam stability in this case is not a significant factor. However, for samples with densities in the range of 47.6 to 49.8 pcf the wet nail pull values were measured in the range of 54 to 69 lbf. For the dry samples with densities in the range of 48.5 to 49.9 the dry nail pull values measured were in the range of 61 to 80 lbf.

TABLE 13

Example 4 for panel mixtures included in FIG. 4

|  | 1 | 2 | 3 | 4 |
|---|---|---|---|---|
| Effective W/C Ratio | 0.465:1 | 0.465:1 | 0.465:1 | 0.465:1 |
| Type III Portland cement, g | 1267.24 | 1267.24 | 1267.24 | 1267.24 |
| Class C Fly Ash, g | 380.17 | 380.17 | 380.17 | 380.17 |
| Land Plaster, g | 152.07 | 152.07 | 152.07 | 152.07 |
| Triethanolamine (85%), g | 3.18 | 3.18 | 3.18 | 3.18 |
| STMP (Solid), g | 1.80 | 1.80 | 1.80 | 1.80 |
| Sodium Citrate (Solid), g | 4.50 | 4.50 | 4.50 | 4.50 |
| Superplasticizer PCE (40%), g | 17.99 | 17.99 | 17.99 | 17.99 |
| PVOH (2% solution), g | 120 | 120 | 0 | 0 |
| Foam Water, g | 0 | 0 | 80 | 80 |
| AOS1, g soap, g | 10 | 10.6 | 10 | 11 |
| Foam Volume, % | 41.5 | 41.9 | 42.4 | 41.2 |
| Expanded Clay Aggregate | 720 | 720 | 720 | 720 |
| Coated Perlite | 143.96 | 143.96 | 143.96 | 143.96 |
| Total Batch Size, g | 3500.0 | 3500.0 | 3500.0 | 3500.0 |
| Batch volume, mL | 4240.8 | 4274.0 | 4316.2 | 4224.4 |
| Thickness, in (dry samples) | 0.509 | 0.483 | 0.500 | 0.498 |
| Dry Density, pcf | 48.5 | 48.1 | 49.9 | 49.1 |
| Dry Nail Pull, lbf | 77 | 61 | 80 | 63 |
| Thickness, in (wet samples) | 0.517 | 0.495 | 0.499 | 0.495 |
| Dry Density, pcf (prior to water) | 48.8 | 47.6 | 49.8 | 48.9 |
| Wet Nail Pull, lbf | 67 | 54 | 69 | 56 |
| Wet Slurry Density, pcf | 51.5 | 51.1 | 50.6 | 51.7 |

Example 5

The next series of mixtures (Examples 5, 6, and 7) were made without expanded lightweight aggregate, but using a blend of the PVOH (2%) solution pre-mixed with various foaming agents and then aerated to form the required amount of foam that would yield cube specimens with varied densities. The lab panels (½"×3'×1') were then cured for 14 days in a room with controlled temperature of 90° F. and relative humidity of 90%. The data collected from the set samples made from these mixtures showed removing the lightweight aggregate beneficially results in improved compressive strengths and nail pull performance.

Figure 5:
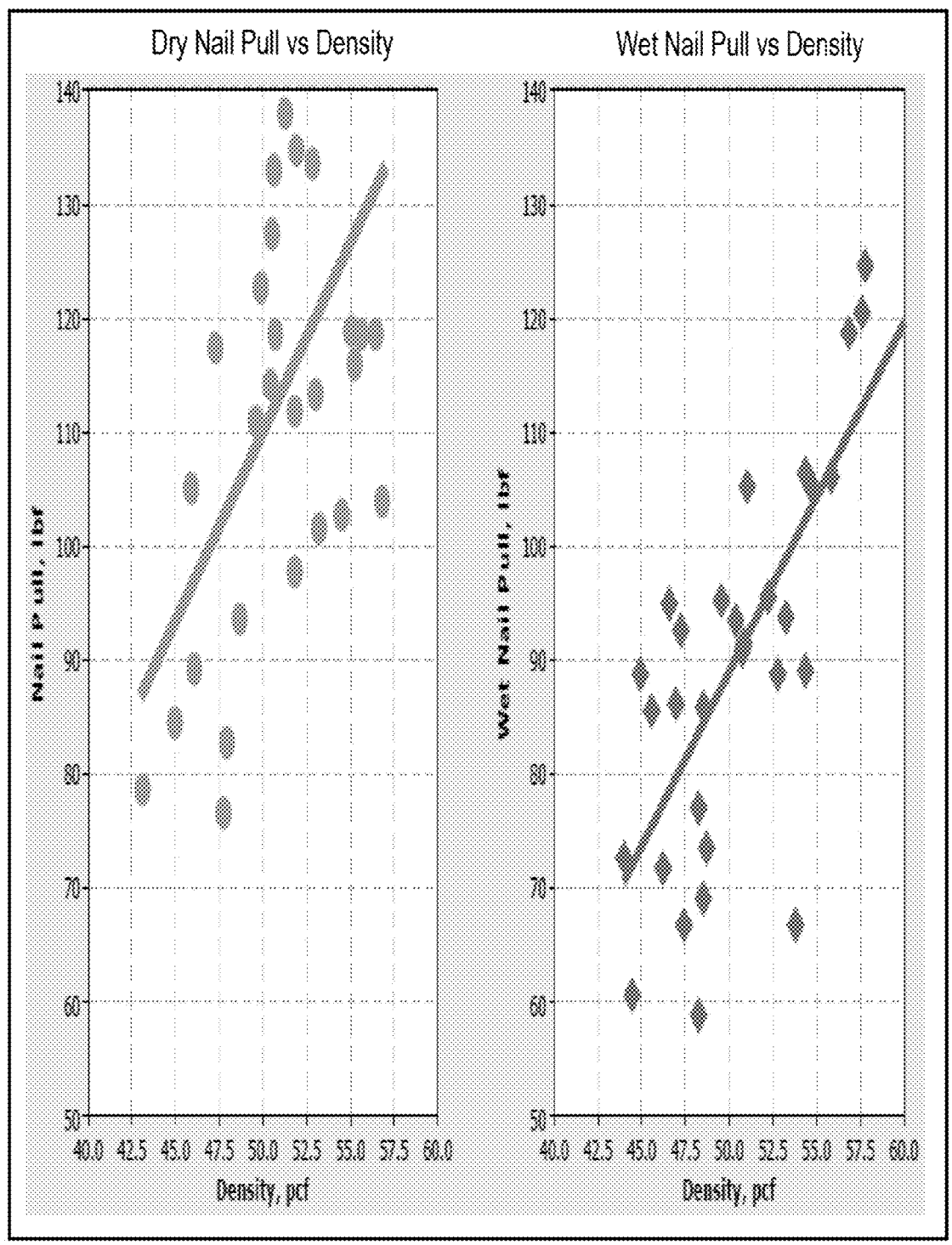
FIG. 5 shows nail pull data for Example 5 for panel mixtures of Example 5.

FIG. 5 shows the summary, as an average of all four mixtures, of nail pull values measured for these foamed cement samples while dry and after water immersion. TABLE 14 include the proportions for mixtures without expanded clay aggregate A/C=0 using AOS1 soap as the foaming agent. For samples with average densities in the range of 46.3 to 53.3 pcf the wet nail pull values were measured in the range of 85.8 to 98 lbf. For the dry samples with density in the range of 48.6 to 52.6 the dry nail pull values measured were in the range of 95 to 119 lbf. These values are about 50% higher compared with the nail pull values measured for samples in Example 4 which contained similar formulation but including expanded clay aggregate at a weight ratio of A/C=0.40 and W/C=0.57.

TABLE 14

Example 5 for panel mixtures included in FIG. 5

|  | 1-1 | 1-2 | 2-1 | 2-2 |
|---|---|---|---|---|
| Effective W/C Ratio | 0.400:1 | 0.400:1 | 0.400:1 | 0.400:1 |
| Type III Portland cement, g | 1676.73 | 1676.73 | 1676.73 | 1676.73 |
| Class C Fly Ash, g | 503.02 | 503.02 | 503.02 | 503.02 |
| Land Plaster | 201.21 | 201.21 | 201.21 | 201.21 |
| Triethanolamine (85%) | 4.20 | 4.20 | 4.20 | 4.20 |
| STMP (Solid) | 2.38 | 2.38 | 2.38 | 2.38 |
| Sodium Citrate (Solid) | 5.95 | 5.95 | 5.95 | 5.95 |
| Superplasticizer PCE (40%) | 23.81 | 23.81 | 23.81 | 23.81 |
| PVOH (2% solution), g | 130 | 130 | 160 | 160 |
| AOS1 soap, g | 12 | 16 | 16 | 20 |
| Foam Volume, % | 37.8 | 37.9 | 40.8 | 44.3 |
| Aggregate | 0 | 0 | 0 | 0 |
| Coated perlite | 166.67 | 166.67 | 166.67 | 166.67 |
| Total Batch Size, g | 3500.0 | 3500.0 | 3500.0 | 3500.0 |
| Batch volume, mL | 3872.3 | 3900 | 4089.9 | 4333.3 |
| Thickness, in (dry samples) | 0.469 | 0.508 | 0.493 | 0.549 |
| Dry Density, pcf | 52.6 | 52.0 | 51.4 | 48.6 |
| Dry Nail Pull, lbf | 114 | 95 | 111 | 119 |
| Thickness, in (wet samples) | 0.468 | 0.495 | 0.495 | 0.538 |
| Dry Density, pcf (prior to water immersion) | 53.3 | 54.7 | 50.0 | 46.3 |
| Wet Nail Pull, lbf | 98 | 97 | 91 | 85.8 |
| Wet Slurry Density, pcf | 56.4 | 56.0 | 53.4 | 50.4 |

Example 6

Figure 6:
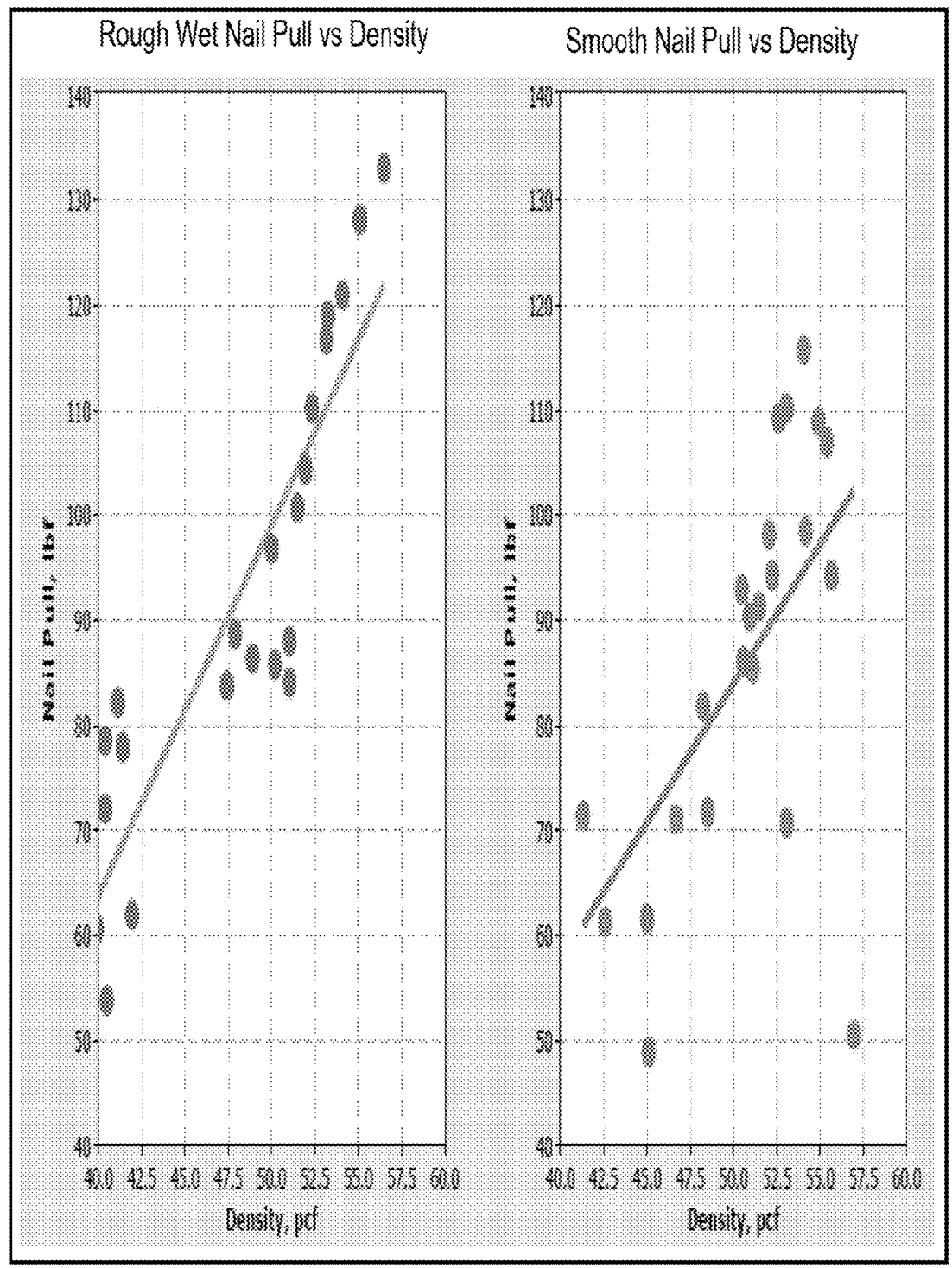
FIG. 6 shows wet nail pull data for panel samples from mixtures in Example 6 tested from the smooth and the rough sides.

The next series of mixtures were made without expanded lightweight aggregate and without using the PVOH (2%) solution. The lab panels (½"×3'×1') were then cured for 14 days in a room with controlled temperature of 90° F. and relative humidity of 90%. FIG. 6 shows the summary, as an average of all three mixes, of nail pull values measured as a function of density and tested from the smooth and the rough sides after samples were immersed in water. TABLE 15 includes the proportions for mixtures with A/C wt ratio=0:1 using SLS soap as the foaming agent instead of the AOS1 soap. In this case all nail pull samples were measured after water immersion and test was conducted for samples from the smooth and the rough side. There was no significant difference between top and bottom side test. Samples with average densities in the range of 40.8 to 53.3 pcf measured wet nail pull values in the range of 69 to 111 lbf. While this might seem lower values than in the previous example the density range for these samples extended down to the 40 pcf, because the SLS soap foams up more easily than the AOS1 soap foaming agent.

TABLE 15

Example 6 for panel mixtures included in FIG. 6

|  | 1 | 2 | 3 |
|---|---|---|---|
| Effective W/C Ratio | 0.400 | 0.400 | 0.400 |
| Type III Portland cement, g | 1676.73 | 1676.73 | 1676.73 |
| Class C Fly Ash, g | 503.02 | 503.02 | 503.02 |
| Land Plaster, g | 201.21 | 201.21 | 201.21 |
| Triethanolamine (85%), g | 4.20 | 4.20 | 4.20 |
| STMP (Solid), g | 2.38 | 2.38 | 2.38 |
| Sodium Citrate (Solid), g | 5.95 | 5.95 | 5.95 |
| Superplasticizer PCE (40%), g | 23.81 | 23.81 | 23.81 |
| PVOH (2% solution), g | 0 | 0 | 0 |
| Foam Water, g | 40 | 30 | 30 |
| SLS soap, g | 4 | 3 | 3 |
| Foam Volume, % | 48.8 | 43.4 | 39.9 |
| Expanded clay aggregate | 0 | 0 | 0 |
| Coated perlite, g | 166.67 | 166.67 | 166.67 |
| Total Batch Size, g | 3500.0 | 3500.0 | 3500.0 |
| Batch volume, mL | 4730 | 4266 | 4015 |
| Bottom side samples |  |  |  |
| Thickness, in (wet samples) | 0.516 | 0.486 | 0.518 |
| Dry Density, pcf (prior to water immersion) | 45.7 | 51.2 | 54.6 |
| Wet Nail Pull, lbf | 69 | 92 | 94.4 |
| Wet Slurry Density, pcf | 46.2 | 51.2 | 54.4 |
| Top side samples |  |  |  |
| Thickness, in (wet samples) | 0.496 | 0.487 | 0.494 |
| Dry Density, pcf (prior to water immersion) | 40.8 | 52.8 | 52.8 |
| Wet Nail Pull, lbf | 70 | 91 | 111 |
| Wet Slurry Density, pcf | 46.2 | 51.2 | 54.4 |

Optical Microscopic Analysis

The Olympus stereo binocular microscope model SZX16 was used to inspect the fracture surface of samples of various specimens with the new developed formulas using the same magnification (25×) for all pictures included in FIGS. 7A-10. The electronic images were collected through the optical microscope using a digital camera OLYMPUS DP71 with low noise for accurate pictures and recorded using special software.

Figure 7A:
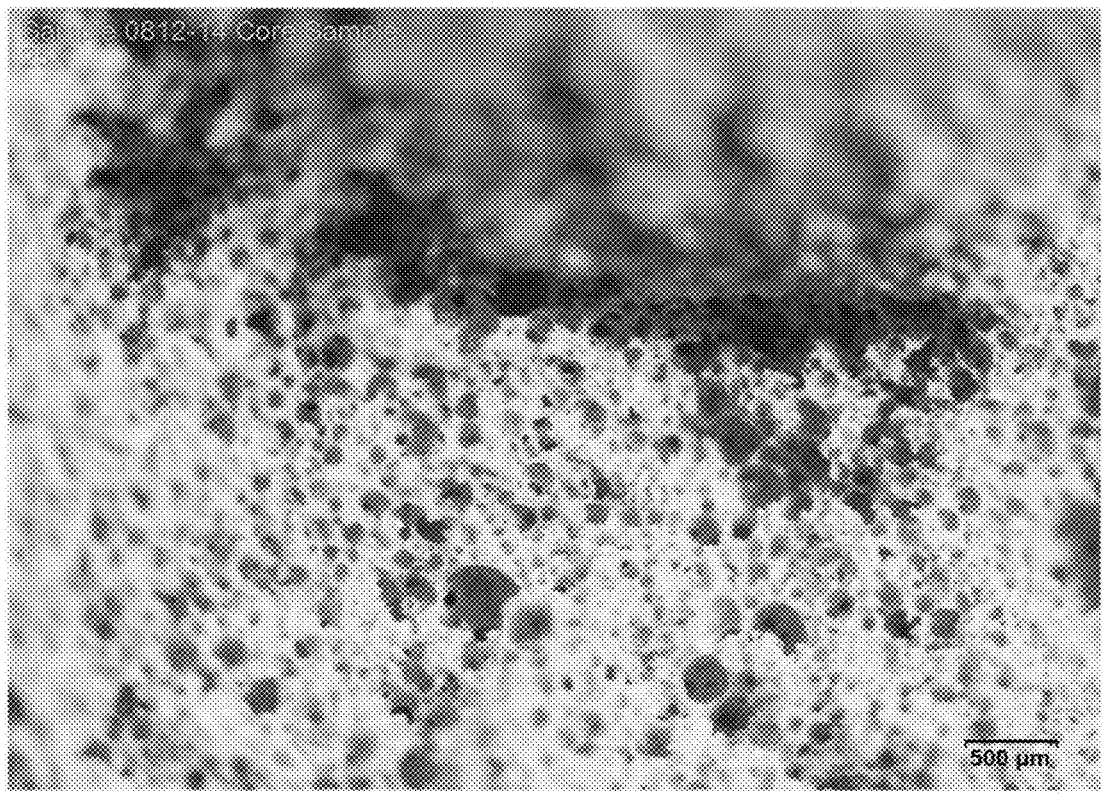
FIGS. 7A, 7B show the optical micrographs for a specimen made with formula described in TABLE 13
Figure 7B:
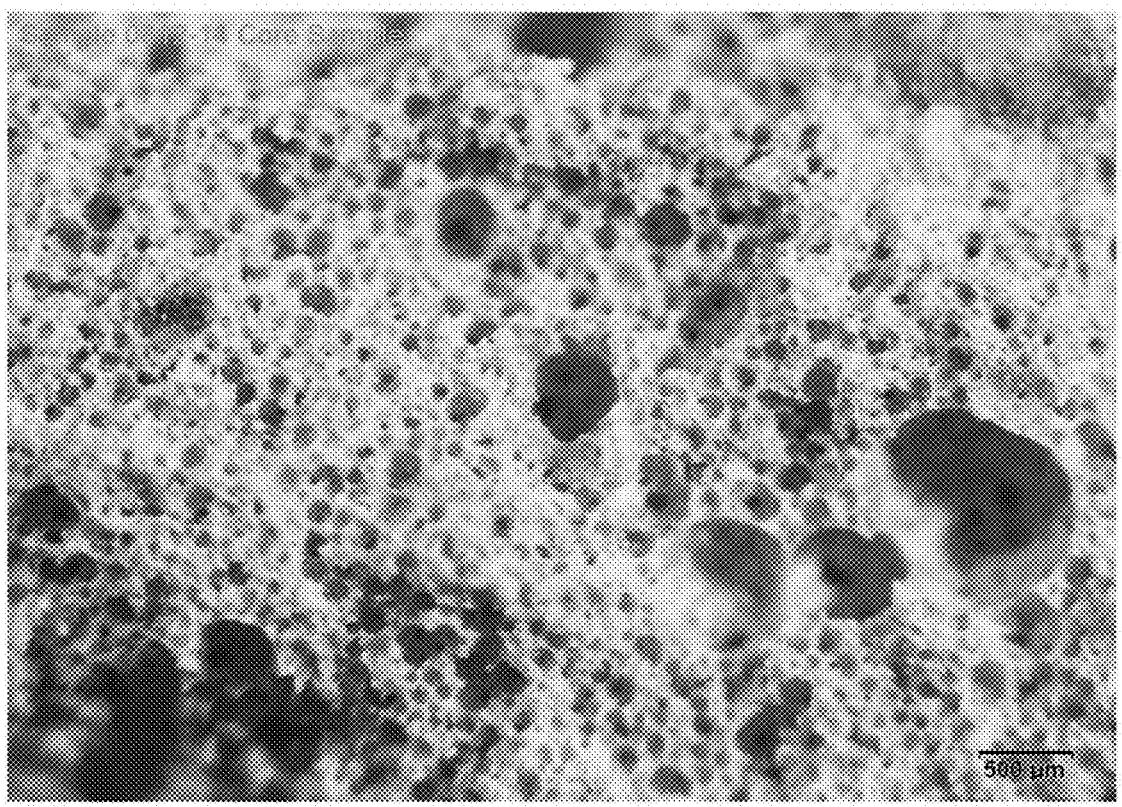

FIGS. 7A-7B shows the optical micrographs for portions, respectively, of a specimen made with formula described in TABLE 13 for mixture #3 containing expanded clay aggregate. For this mixture the average density of 50 pcf and the measured average dry nail pull was 80 lbf and the wet nail pull was 69 lbf. The micrographs included in FIGS. 7A-7B show bubble size was relatively small in the range of 50 to 100 μm and some larger ones 250 μm with a few up to 400 μm. In addition, the fractured surface is through the foamed cement paste and not through the aggregate.

Figure 8A:
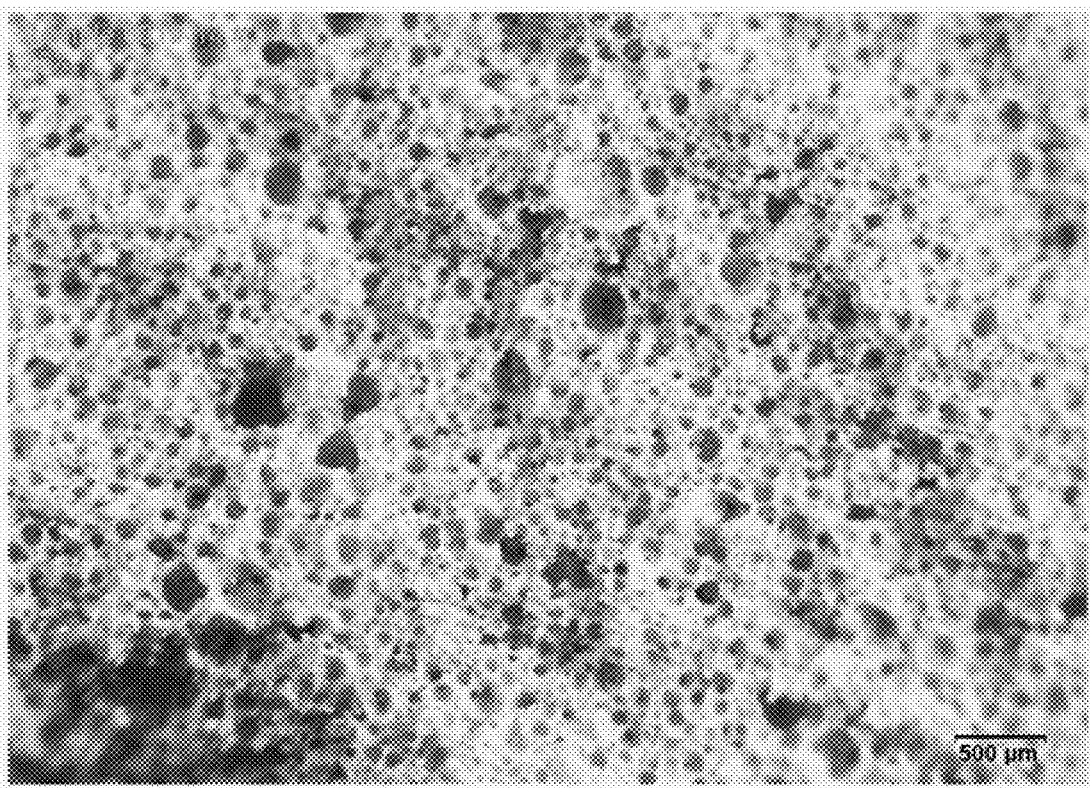
FIGS. 8A, 8B show the optical micrographs for a specimen made with formula described in TABLE 15 for mixture 081914 #1 without expanded clay aggregate.
Figure 8B:
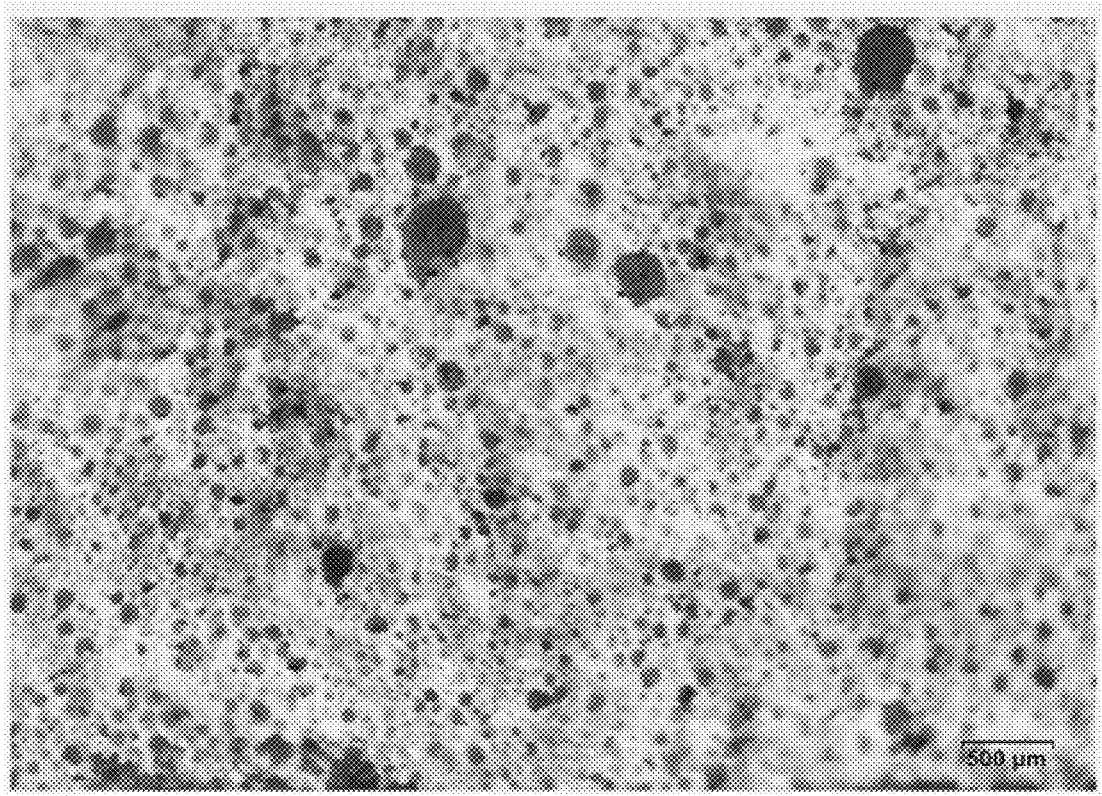

FIGS. 8A-8B shows the optical micrograph for portions, respectively, of a specimen made with formula described in TABLE 15 for TABLE 13 mixture #1 without expanded clay aggregate. For this mixture the average density of 50.5 pcf and the average dry and wet nail pull values were measured at 111 lbf and 91 lbf, respectively. The micrographs in FIGS. 8A-8B showed bubble size was relatively small in the range of 50 to 100 μm but larger bubbles in the range of 250 to 500 μm are not visible, as opposed to those observed in the specimen with lightweight aggregate included in FIGS. 7A-7B.

Therefore, inventor theorizes the main reason for the nail pull and strength improvement in the specimens shown in FIG. 8 without lightweight aggregate is the increased amount of cementitious material and the relatively smaller bubbles which allows for the increased foam volume.

Figure 9A:
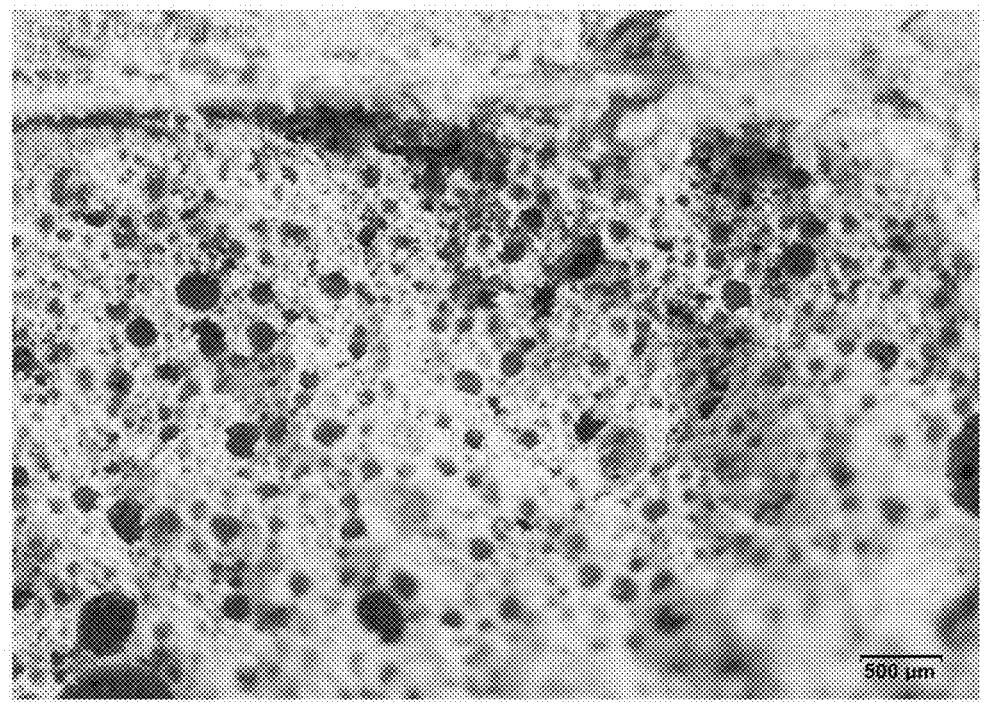
FIGS. 9A, 9B show the fractured surface of panel samples.
Figure 9B:
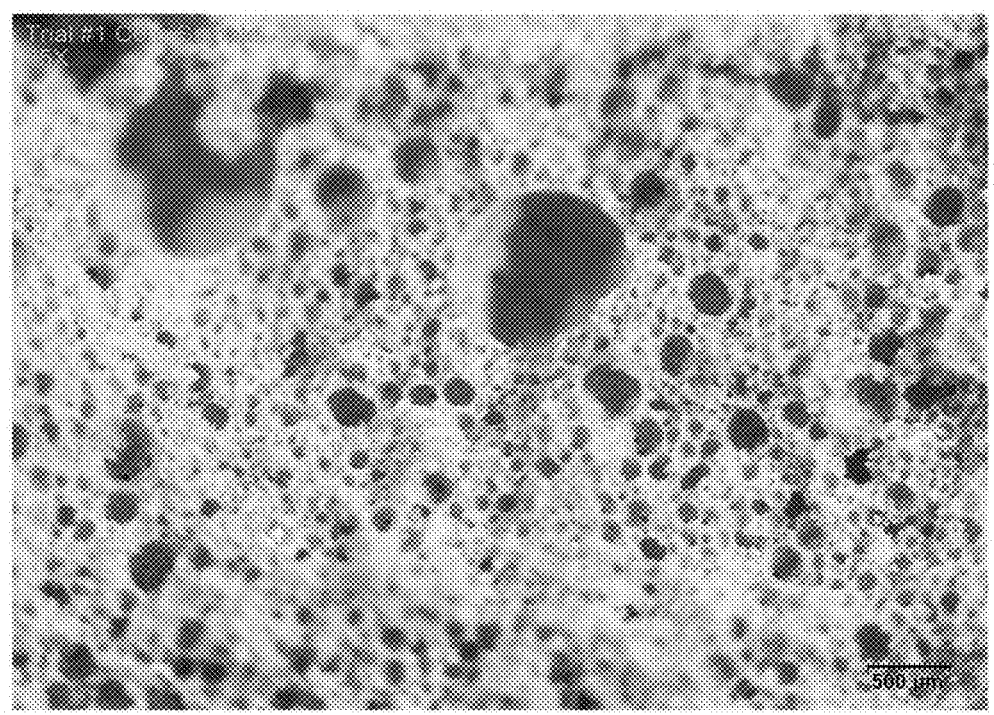

FIGS. 9A-9B show optical micrographs of the fractured surface of panel samples from a first trial conducted at commercial size plant with the developed formulations. Overall, the bubbles size seems to be similar to the lab samples shown in FIGS. 7A-8B with still some improvement needed to minimize some of the larger bubbles in the 250 to 500 µm range observed in the bottom micrograph shown in FIG. 9B.

Although we have described the preferred embodiments for implementing our invention, it will be understood by those skilled in the art to which this disclosure is directed that modifications and additions may be made to our invention without departing from its spirit and scope.

I claim:

1. A method of providing a lightweight cementitious product comprising:
    mixing a cementitious foamed mixture comprising:
        65-75 wt. % hydraulic cementitious reactive powder,
        0.05-1 wt. % surfactant as a foaming agent,
        0.1-1.0 wt. % polyvinyl alcohol as a foam stabilizing agent,
        0.1-0.5 wt. % retarder selected from the group consisting of gluconates, citric acid, alkali metal salts of citric acid, and mixtures thereof,
    0.15-1.0 wt. % superplasticizer;
    optionally, at least one member selected from the group consisting of aggregate and filler, at a weight ratio of total aggregate and filler to hydraulic cementitious reactive powder of 0 to 0.5:1, wherein all aggregate and filler of the cementitious foamed mixture is only lightweight non-porous aggregate and lightweight non-porous filler, wherein the lightweight non-porous aggregate and lightweight non-porous filler have a particle density of less than or equal to 40 lbs/cubic foot, wherein the lightweight non-porous filler and the lightweight non-porous aggregate have an open porosity of at most 0.10;
    water, wherein the cementitious foamed mixture weight ratio of water to hydraulic cementitious reactive powder is 0.3 to 0.5:1; and
    air in the form of foam bubbles with diameters in the range of 50 to 200 µm, wherein the foamed mixture has an air volume content of 20 to 55 volume %;
    wherein the hydraulic cementitious reactive powder comprises in % by weight relative to the weight of the hydraulic cementitious reactive powder: 75 to 95% Portland cement, 0 to 21% high alumina cement, 0 to 10% calcium sulfate, and 0 to 25% pozzolanic material;
    casting the cementitious foamed mixture; and
    leaving the cast mixture to set to form the lightweight cementitious product, wherein after setting the set cementitious foamed mixture the lightweight cementitious product has, measured 14 days after casting, a nominal density of 45-60 pounds per cubic foot and a nail pull value of greater than 90 pounds-force; wherein after setting the cementitious foamed mixture the lightweight cementitious product has a compressive strength, measured 7 days after casting, of 500 psi to about 5000 psi.

2. The method of claim 1, wherein the air is added by aerating a blend of a first portion of the water, the surfactant, and the polyvinyl alcohol with entrainment of air to form foam water, wherein the surfactant is 1 to 15 wt. % of the foam water; wherein the polyvinyl alcohol is 1 to 5 wt, % of the foam water; blending the foam water and a slurry comprising the hydraulic cementitious reactive powder, a second portion of the water, an optional second portion of the polyvinyl alcohol, and an optional second portion of the surfactant, to produce the cementitious foamed mixture; wherein the foamed mixture weight ratio of said foam water to said cementitious reactive powder is 0.01 to 0.05:1, wherein after setting the cementitious foamed mixture has an air cells volume content of 20 to 55 volume %, wherein after setting the cementitious foamed mixture has air cells with diameters in the range of 50 to 200 µm.

3. The method of claim 2, wherein the foam water adds a first portion of the air to the slurry to form a foamed slurry, the method further comprising mixing the foamed slurry in the presence of air to entrain a second portion of the air into the foamed slurry.

4. The method of claim 1, wherein the air is added by entraining the air into a slurry comprising the hydraulic cementitious reactive powder, the surfactant, the polyvinyl alcohol, the retarder, the superplasticizer, and the water.

5. The method of claim 1, wherein the mixture further comprises an alkali metal silicate, triethanolamine, and a phosphate selected from the group consisting of sodium trimetaphosphate, potassium tripolyphosphate, sodium tripolyphosphate, tetrasodium pyrophosphate, tetrapotassium pyrophosphate, monopotassium phosphate, dicalcium phosphate, and mixtures thereof.

6. The method of claim 1, wherein at least 80% of the total aggregate and filler is coated perlite.

7. The method of claim 1, wherein the surfactant comprises an anionic surfactant selected from the group consisting of alkyl benzene sulfonate, fatty acid salts, sodium lauryl sulfate, alkyl sulfate salts, sodium lauryl ether sulfate, sodium alkyl ether sulfate, sodium C14-16 olefin sulfonate, alpha-olefin sulfonates, phosphate esters, sulphosuccinates, alkyl phenol ether sulfates, and isethionates.

8. The method of claim 1, wherein the water to hydraulic cementitious reactive powder weight ratio is 0.32 to 0.38:1, wherein the Portland cement ranges from about 75% to about 90% of the hydraulic cementitious reactive powder, the high alumina cement ranges from about 0% to about 10% of the hydraulic cementitious reactive powder, and the calcium sulfate ranges from about 2% to about 5% of the hydraulic cementitious reactive powder.

9. The method of claim 1, wherein the cast mixture forms into a sheet, and wherein setting comprises setting the sheet to an initial set condition; the method further comprising cutting the sheet in the initial set condition to form a pre-cured board; and wherein the pre-cured board is cured to a final set condition to form a board product; wherein the board product has a density of 40-90 pcf and a nail pull value greater than or equal to 90 pounds-force, wherein the board has air cells with diameters in the range of 50 to 200 µm.

10. The method of claim 1, wherein the cementitious foamed mixture has an absence of calcium chloride, calcium formate, and calcium nitrate.

11. A foamed cement product comprising a set foamed mixture produced according to the method claim 1.

12. The foamed cement product of claim 11, having a nominal density of 48 to 53 pounds per cubic foot, nail pull values in the range of 90 to 110 pounds-force, and compressive strength of 600-900 psi.

13. A cement product comprising a set cementitious foamed mixture comprising:
    65-75 wt. % hydraulic cementitious reactive powder,
    0.05-1 wt. % surfactant as a foaming agent,
    0.1-1.0 wt. % polyvinyl alcohol as a foam stabilizing agent, 0.1-0.5 wt. % retarder selected from the group consisting of gluconates, citric acid, alkali metal salts of citric acid, and mixtures thereof, 0.15-1.0 wt. % superplasticizer;

optionally, at least one member selected from the group consisting of aggregate and filler at a weight ratio up to 0.5:1 of total aggregate and filler to hydraulic cementitious reactive powder, wherein all aggregate and filler of the set cementitious foamed mixture is only lightweight non-porous aggregate and lightweight non-porous filler, wherein the lightweight non-porous aggregate and lightweight non-porous filler have a particle density of less than or equal to 40 lbs/cubic foot, wherein the lightweight non-porous filler and the lightweight non-porous aggregate have an open porosity of at most 0.10;

wherein the cement product has air cells with diameters in the range of 50 to 200 µm, wherein the cement product has an air cells volume content of 20 to 55 volume %;

wherein the hydraulic cementitious reactive powder comprises in % by weight relative to the weight of the hydraulic cementitious reactive powder:

75 to 95% Portland cement, 0 to 21% high alumina cement, 0 to 10% calcium sulfate, and 0 to 25% pozzolanic material;

wherein the cement product was made with a weight ratio of water to hydraulic cementitious reactive powder of 0.3 to 0.5:1;

wherein the cement product has a nominal density of 45-60 pounds per cubic foot, and a nail pull value of greater than 90 pounds-force; and wherein the cement product has a compressive strength, measured after setting 7 days, of 500 psi to about 5000 psi.

14. The product of claim 13, having a nominal density of 48 to 53 pounds per cubic foot, a nail pull value in a range of 90 to 110 pounds-force, and a compressive strength of 600-900 psi.

15. The product of claim 13, wherein the mixture further comprises an alkali metal silicate, triethanolamine, and a phosphate selected from the group consisting of sodium trimetaphosphate, potassium tripolyphosphate, sodium tripolyphosphate, tetrasodium pyrophosphate, tetrapotassium pyrophosphate, monopotassium phosphate, dicalcium phosphate, and mixtures thereof.

16. The product of claim 13, wherein the surfactant is an anionic surfactant comprising a polar group selected from the group consisting of carboxylate, sulfate, sulfonate and phosphate, and wherein the retarder is at least one member selected from the group consisting of sodium citrate, potassium citrates, citric acid, gluconates, and mixtures thereof.

17. The product of claim 13, further comprising:

at least one member selected from the group consisting of triethanolamine, sodium citrate, and sodium trimetaphosphate, wherein the superplasticizer comprises a polycarboxylate.

18. The product of claim 13, wherein the surfactant comprises an anionic surfactant selected from the group consisting of alkyl benzene sulfonate, fatty acid salts, sodium lauryl sulfate, alkyl sulfate salts, sodium alkyl ether sulfate, sodium lauryl ether sulfate, alpha-olefin sulfonates, sodium C14-16 olefin sulfonate, phosphate esters, sulphosuccinates, alkyl phenol ether sulfates, and isethionates, wherein the retarder is selected from the group consisting of citric acid, alkali metal salts of citric acid, and mixtures thereof.

19. A cement product comprising a set cementitious foamed mixture comprising:

65-75 wt. % hydraulic cementitious reactive powder;

0.05-1 wt. % surfactant as a foaming agent;

0.1-1.0 wt. % polyvinyl alcohol as a foam stabilizing agent;

0.1-0.5 wt. % retarder selected from the group consisting of gluconates, citric acid, alkali metal salts of citric acid, and mixtures thereof;

0.15-1.0 wt. % superplasticizer;

optionally, at least one member selected from the group consisting of aggregate and filler at a weight ratio up to 0.5:1 of total aggregate and filler to hydraulic cementitious reactive powder, wherein all aggregate and filler of the set cementitious foamed mixture is only lightweight non-porous aggregate and lightweight non-porous filler, wherein the lightweight non-porous aggregate and lightweight non-porous filler have a particle density of less than or equal to 40 lbs/cubic foot, wherein the lightweight non-porous filler and the lightweight non-porous aggregate have an open porosity of at most 0.10;

wherein the cement product has air cells with diameters in the range of 50 to 200 µm, wherein the cement product has an air cells volume content of 20 to 55 volume %;

wherein the hydraulic cementitious reactive powder comprises in % by weight relative to the weight of the hydraulic cementitious reactive powder:

73 to 76% Portland cement, 5 to 10% high alumina cement, and 2 to 10% calcium sulfate, and 0 to 25% pozzolanic material;

wherein the cement product was made with a weight ratio of water to hydraulic cementitious reactive powder of 0.32 to 0.38:1;

wherein the cement product has a nominal density of 45-60 pounds per cubic foot, and a nail pull value of greater than 90 pounds-force; and wherein the cement product has a compressive strength, measured after setting 7 days, of 500 psi to about 5000 psi.

20. The product of claim 13, wherein the product is a sheet comprising the set cementitious foamed mixture, the sheet having a thickness of 0.25 to 2 inches.

* * * * *